United States Patent
Donovan et al.

(10) Patent No.: US 10,021,933 B2
(45) Date of Patent: Jul. 17, 2018

(54) ARTICLE OF FOOTWEAR WITH COLOR CHANGE PORTION AND METHOD OF CHANGING COLOR

(71) Applicant: NIKE, Inc., Beaverton, OR (US)

(72) Inventors: Sharna M. Donovan, Hillsboro, OR (US); Sean D. Hartford, Hillsboro, OR (US); Michelle L. Mishler, Tigard, OR (US); Vikram Malhotra, Portland, OR (US); James Molyneux, Portland, OR (US); Andrew A. Owings, Portland, OR (US); Aaron B. Weast, Portland, OR (US); Bradley W. Wilkins, Aloha, OR (US)

(73) Assignee: NIKE, Inc., Beaverton, OR (US)

( * ) Notice: Subject to any disclaimer, the term of this patent is extended or adjusted under 35 U.S.C. 154(b) by 247 days.

(21) Appl. No.: 15/056,849

(22) Filed: Feb. 29, 2016

(65) Prior Publication Data
US 2016/0174650 A1     Jun. 23, 2016

Related U.S. Application Data

(63) Continuation of application No. 14/316,255, filed on Jun. 26, 2014, now Pat. No. 9,301,569, which is a
(Continued)

(51) Int. Cl.
*A43D 1/00* (2006.01)
*A43B 3/00* (2006.01)
(Continued)

(52) U.S. Cl.
CPC .......... *A43B 3/0005* (2013.01); *A43B 1/0027* (2013.01); *A43B 3/001* (2013.01);
(Continued)

(58) Field of Classification Search
CPC ......... A43B 3/24; A43B 1/0027; A43B 3/001; A43B 3/0005; A43B 3/0078; A43B 5/06; A43B 23/0205
(Continued)

(56) References Cited

U.S. PATENT DOCUMENTS 2,982,033 A     5/1961   Bingham, Jr.
3,549,878 A    12/1970   Richard
(Continued)

FOREIGN PATENT DOCUMENTS

CN     101001550 A     7/2007
CN     103379837 A    10/2013
(Continued)

OTHER PUBLICATIONS

Japan Patent Office, Decision of Rejection for JP Application No. 2013-516653, dated Jan. 4, 2016.
(Continued)

*Primary Examiner* — G. Bradley Bennett
(74) *Attorney, Agent, or Firm* — Honigman Miller Schwartz and Cohn LLP; Matthew H. Szalach; Jonathan P. O'Brien

(57) ABSTRACT

An article with a color change portion and a method of changing color. The article includes at least one color change portion capable of changing colors. The color change portion includes composite material including a photonic lattice. The color change portion can change colors according to one or more performance parameters. The article can be connected to a computer and the color change portion can be controlled using the computer.

20 Claims, 24 Drawing Sheets

Related U.S. Application Data continuation-in-part of application No. 14/141,518, filed on Dec. 27, 2013, now Pat. No. 9,226,542, which is a continuation of application No. 13/901,618, filed on May 24, 2013, now Pat. No. 8,650,764, which is a continuation of application No. 12/820,625, filed on Jun. 22, 2010, now Pat. No. 8,474,146.

(51) Int. Cl.
| | | |
|---|---|---|
| *A43B 3/24* | (2006.01) | |
| *A43B 1/00* | (2006.01) | |
| *A43B 5/06* | (2006.01) | |
| *A43B 23/02* | (2006.01) | |
| *G02F 1/153* | (2006.01) | |
| *G02F 1/163* | (2006.01) | |
| *G02F 1/15* | (2006.01) | |

(52) U.S. Cl.
CPC .......... *A43B 3/0036* (2013.01); *A43B 3/0078* (2013.01); *A43B 3/24* (2013.01); *A43B 5/06* (2013.01); *A43B 23/0205* (2013.01); *G02F 1/1533* (2013.01); *G02F 1/163* (2013.01); *G02F 2001/1515* (2013.01); *G02F 2001/1536* (2013.01)

(58) Field of Classification Search
USPC .................................... 33/3 A, 3 B, 3 C, 3 R
See application file for complete search history.

(56) References Cited

U.S. PATENT DOCUMENTS

| | | | |
|---|---|---|---|
| 4,748,366 | A | 5/1988 | Taylor |
| 4,771,394 | A | 9/1988 | Cavanagh |
| 5,142,045 | A | 8/1992 | Zand et al. |
| 5,289,301 | A | 2/1994 | Brewer |
| 5,495,682 | A | 3/1996 | Chen |
| 5,500,635 | A | 3/1996 | Mott |
| 5,813,148 | A | 9/1998 | Guerra |
| 5,906,004 | A | 5/1999 | Lebby et al. |
| 5,955,957 | A | 9/1999 | Calabrese et al. |
| 6,080,690 | A | 6/2000 | Lebby et al. |
| 6,160,254 | A | 12/2000 | Zimmerman et al. |
| 6,182,378 | B1 | 2/2001 | Sendaula |
| 6,640,454 | B2 | 11/2003 | Kato et al. |
| 6,744,145 | B2 | 6/2004 | Chang |
| 6,864,875 | B2 | 3/2005 | Drzaic et al. |
| 6,922,276 | B2 | 7/2005 | Zhang et al. |
| 6,936,190 | B2 | 8/2005 | Yoshida |
| 6,969,291 | B2 | 11/2005 | Urabe et al. |
| 6,987,603 | B2 | 1/2006 | Paolini, Jr. et al. |
| 7,020,508 | B2 | 3/2006 | Stivoric et al. |
| 7,075,226 | B2 | 7/2006 | Cok |
| 7,078,850 | B2 | 7/2006 | Sakai |
| 7,167,155 | B1 | 1/2007 | Albert et al. |
| 7,195,170 | B2 | 3/2007 | Matsumoto et al. |
| 7,201,952 | B2 | 4/2007 | Iftime et al. |
| 7,325,337 | B2 | 2/2008 | Cox et al. |
| 7,364,673 | B2 | 4/2008 | Arsenault et al. |
| 7,409,784 | B2 | 8/2008 | Yeh |
| 7,420,549 | B2 | 9/2008 | Jacobson et al. |
| 7,421,806 | B2 | 9/2008 | Braynock et al. |
| 7,428,471 | B2 | 9/2008 | Darley et al. |
| 7,468,842 | B2 | 12/2008 | Steenblik et al. |
| 7,494,237 | B1 | 2/2009 | Cheung |
| 7,528,822 | B2 | 5/2009 | Amundson et al. |
| 7,535,624 | B2 | 5/2009 | Amundson et al. |
| 7,616,376 | B2 | 11/2009 | Arsenault et al. |
| 7,675,672 | B2 | 3/2010 | Cernasov |
| 7,771,320 | B2 | 8/2010 | Riley et al. |
| 7,826,131 | B2 | 11/2010 | Arsenault et al. |
| 7,944,597 | B2 | 5/2011 | RaginiDas et al. |
| 8,106,849 | B2 | 1/2012 | Reavis et al. |
| 8,112,251 | B2 | 2/2012 | Case, Jr. et al. |
| 8,302,330 | B2 | 11/2012 | Doran |
| 8,474,146 | B2 | 7/2013 | Hartford et al. |
| 8,650,764 | B2 | 2/2014 | Hartford et al. |
| 9,301,569 | B2* | 4/2016 | Donovan ............. A43B 1/0027 |
| 9,864,217 | B2* | 1/2018 | Lussier ..................... G02F 1/09 |
| 2003/0207638 | A1 | 11/2003 | Bowlin et al. |
| 2003/0224155 | A1 | 12/2003 | Orth et al. |
| 2004/0093746 | A1 | 5/2004 | Varsallona |
| 2004/0100792 | A1 | 5/2004 | Trzecieski |
| 2004/0187184 | A1 | 9/2004 | Rubin et al. |
| 2005/0252044 | A1 | 11/2005 | Rhodes-Vivour |
| 2006/0032076 | A1 | 2/2006 | Evanyk et al. |
| 2006/0159907 | A1 | 7/2006 | Percec et al. |
| 2006/0221596 | A1 | 10/2006 | Chang |
| 2006/0275660 | A1 | 12/2006 | Zama et al. |
| 2007/0000154 | A1 | 1/2007 | DiBenedetto et al. |
| 2007/0021269 | A1 | 1/2007 | Shum |
| 2007/0201221 | A1 | 8/2007 | Cherdak et al. |
| 2007/0222370 | A1 | 9/2007 | Zhu et al. |
| 2007/0273951 | A1 | 11/2007 | Ribi |
| 2008/0037131 | A1 | 2/2008 | Steenblik et al. |
| 2008/0062677 | A1 | 3/2008 | Konig et al. |
| 2008/0141433 | A1* | 6/2008 | Rhodes-Vivour ...... A42B 1/004 2/69 |
| 2008/0167535 | A1 | 7/2008 | Stivoric et al. |
| 2008/0258999 | A1 | 10/2008 | Van Doorn |
| 2009/0007458 | A1 | 1/2009 | Seiler |
| 2009/0019731 | A1 | 1/2009 | Braynock et al. |
| 2009/0107009 | A1 | 4/2009 | Bishop et al. |
| 2009/0193689 | A1 | 8/2009 | Galica et al. |
| 2009/0278449 | A1 | 11/2009 | Choi et al. |
| 2009/0278707 | A1 | 11/2009 | Biggins et al. |
| 2010/0005686 | A1 | 1/2010 | Baum |
| 2010/0032660 | A1 | 2/2010 | Nomoto et al. |
| 2010/0053724 | A1 | 3/2010 | Raginidas et al. |
| 2010/0063778 | A1 | 3/2010 | Schrock et al. |
| 2010/0117975 | A1 | 5/2010 | Cho |
| 2010/0150511 | A1 | 6/2010 | Arsenault et al. |
| 2010/0274447 | A1 | 10/2010 | Stumpf |
| 2010/0289971 | A1 | 11/2010 | Odland et al. |
| 2011/0032105 | A1 | 2/2011 | Hoffman et al. |
| 2011/0083341 | A1 | 4/2011 | Baum |
| 2011/0104535 | A1 | 5/2011 | Arsenault et al. |
| 2011/0107771 | A1 | 5/2011 | Crist et al. |
| 2011/0164308 | A1 | 7/2011 | Arsenault et al. |
| 2011/0192053 | A1 | 8/2011 | Beers |
| 2011/0199393 | A1 | 8/2011 | Nurse et al. |
| 2011/0222142 | A1 | 9/2011 | Arsenault |
| 2011/0233416 | A1 | 9/2011 | Mazuir et al. |
| 2011/0233476 | A1 | 9/2011 | Arsenault |
| 2011/0265347 | A1 | 11/2011 | Leary et al. |
| 2011/0308113 | A1 | 12/2011 | Hartford et al. |
| 2011/0314698 | A1 | 12/2011 | Cox et al. |
| 2012/0044970 | A1 | 2/2012 | Arsenault |
| 2012/0078396 | A1 | 3/2012 | Case, Jr. et al. |
| 2012/0234111 | A1 | 9/2012 | Molyneux et al. |
| 2012/0251079 | A1 | 10/2012 | Meschter et al. |
| 2012/0286642 | A1 | 11/2012 | Cheng et al. |
| 2012/0291563 | A1 | 11/2012 | Schrock et al. |
| 2012/0291564 | A1 | 11/2012 | Amos et al. |
| 2012/0291565 | A1 | 11/2012 | Ludowise et al. |
| 2012/0293802 | A1 | 11/2012 | Ozin et al. |
| 2013/0033378 | A1 | 2/2013 | Donovan et al. |
| 2013/0106603 | A1 | 5/2013 | Weast et al. |
| 2013/0213144 | A1 | 8/2013 | Rice et al. |
| 2013/0213146 | A1 | 8/2013 | Amos et al. |
| 2013/0213147 | A1 | 8/2013 | Rice et al. |
| 2013/0239625 | A1 | 9/2013 | Meir et al. |
| 2013/0247420 | A1 | 9/2013 | Pangelinan |
| 2013/0318830 | A1 | 12/2013 | Hartford et al. |
| 2013/0332107 | A1 | 12/2013 | Hlavacek et al. |
| 2014/0173936 | A1 | 6/2014 | Hartford et al. |
| 2015/0013184 | A1 | 1/2015 | Beers |
| 2015/0059214 | A1 | 3/2015 | Donovan et al. |
| 2015/0201705 | A1* | 7/2015 | Doremus ............. A43B 3/0078 36/45 |
| 2015/0223568 | A1 | 8/2015 | Ortner |
| 2015/0289579 | A1 | 10/2015 | Meir |
| 2015/0305441 | A1 | 10/2015 | Sebastian |

(56) References Cited

U.S. PATENT DOCUMENTS

| | | | | |
|---|---|---|---|---|
| 2017/0168328 | A1* | 6/2017 | Lussier | G02F 1/092 |
| 2017/0245594 | A1* | 8/2017 | Truitt | A43B 23/026 |
| 2017/0339773 | A1* | 11/2017 | Chen | H05B 33/0857 |

FOREIGN PATENT DOCUMENTS

| | | | |
|---|---|---|---|
| EP | 2584926 | A1 | 5/2013 |
| JP | S628701 | A | 1/1987 |
| JP | S6449105 | U | 3/1989 |
| JP | H03102910 | U | 10/1991 |
| JP | 2001148291 | A | 5/2001 |
| JP | 2001204507 | A | 7/2001 |
| JP | 2010040897 | A | 2/2010 |
| JP | 2010505451 | A | 2/2010 |
| JP | 2013529504 | A | 7/2013 |
| WO | WO-2007001809 | A2 | 1/2007 |
| WO | WO-2007072352 | A2 | 6/2007 |
| WO | WO-2007121355 | A2 | 10/2007 |
| WO | WO-2007123970 | A2 | 11/2007 |
| WO | WO-2007128049 | A1 | 11/2007 |
| WO | WO-2009096802 | A1 | 8/2009 |
| WO | WO-2009115913 | A2 | 9/2009 |
| WO | WO-2009130551 | A1 | 10/2009 |
| WO | WO-2009134860 | A1 | 11/2009 |
| WO | WO-2010057307 | A1 | 5/2010 |
| WO | WO-2011044682 | A1 | 4/2011 |
| WO | WO-2011057410 | A1 | 5/2011 |
| WO | WO-2011163125 | A1 | 12/2011 |
| WO | WO-2012065244 | A1 | 5/2012 |
| WO | WO-2012079152 | A1 | 6/2012 |
| WO | WO-2012100338 | A1 | 8/2012 |

OTHER PUBLICATIONS

Japan Patent Office, Final Office Action for Japanese Patent Application No. 2013-516653 dated Mar. 10, 2015.
State Intellectual Property Office (P.R.C.), Office Action for Chinese Patent Application No. 201180040700.8, dated Apr. 22, 2015.
USPTO, Non-Final Office Action for U.S. Appl. No. 13/528,240, dated Feb. 21, 2014.
Japan Patent Office, Non-Final Office Action for Japanese Patent Application No. 2013-516653 dated Jul. 1, 2014.
http://soft-matter.seas.harvard.edu/index.php/Photonic_Papers_and_Inks:_Color_Writing_with_Colorless_Material, Photonic Papers and Inks: Color Writing with Colorless Materials—Soft Matter, "Photonic Papers and Inks: Color Writing with Colorless Materials," pp. 1-2.
https://whatis.techtarget.com/definition/photonic-ink-P-ink, photonic ink (P-ink), Definition of Photonic ink (P-ink) (1 page).
http://www.nature.com/am/journal/v2/n1/full/am20106.html, NPG Asia Materials—Photonic crystals: Desktop manufacturing, Photonic crystals: Desktop manufacturing, NPG Asia Materials research highlight; doi: 10.1038/asiamat.2009.14, Published online Oct. 19, 2009, pp. 1-2.
http://www.jst.go.jp/erato/igarashi/projects/ShaderPrinter/siggraph2012Daniel.pdf, Online Submission ID: 311, "Persistant and Rewritable Projection with Bi-Stable Color Inks," pp. 1-7.
Presentation, "P-INK Displays Flexible, Low Power, Reflective Color," Dr. Andre Arsenault, CTO, SID Display Week 2012, Boston, MA, (19 pages).
Photonic Crystal Research—Ab Initio Physics Research, John D. Joannopoulos, MIT (1 page).
www.naowerk.com/spotlight/spotid=12170.php, nano werk, "Rewritable photonic paper," Posted Aug. 17, 2009 (pp. 1-3).
C.M. Soukoulis, "Photonic Band Gap Materials: The Seminconductors" of the Future?, Physica Scripta, vol. T66, pp. 146-150, 1996.
E. Yablonovitch, "Photonic band-gap structures," J. Opt. Soc. Am. B, vol. 10, No. 2, Feb. 2, 1993.
A. Saib et al., "Magnetic photonic band-gap material at microwave frequencies based on ferromagnetic nanowires", Applied Physics Letters, vol. 83, Issue 12, Magnetism and Superconductivity, 2003.
Presentation, "Photonic Band Gap Materials: A Semiconductor for Light," www.physics.utoronto.ca/~john.
USPTO, Notice of Allowance for U.S. Appl. No. 14/141,518, dated Jun. 11, 2015.
International Preliminary Report on Patentablity and Written Opinion for Application No. PCT/US2014/041068, dated Jan. 10, 2013.
International Search Report and Written Opinion for Application No. PCT/US2011/041068, dated Dec. 5, 2011.
Martins R., et al, "Selective Floating Gate Non-Volatile Paper Memory Transistor," Rapid Research Letters, 2009, vol. 3 (9), pp. 308-310.
State Intellectual Property Office, Second Office Action for Chinese Patent Application No. 20201410851729.X, dated Dec. 12, 2016, including English-language translation (11 pages).

* cited by examiner

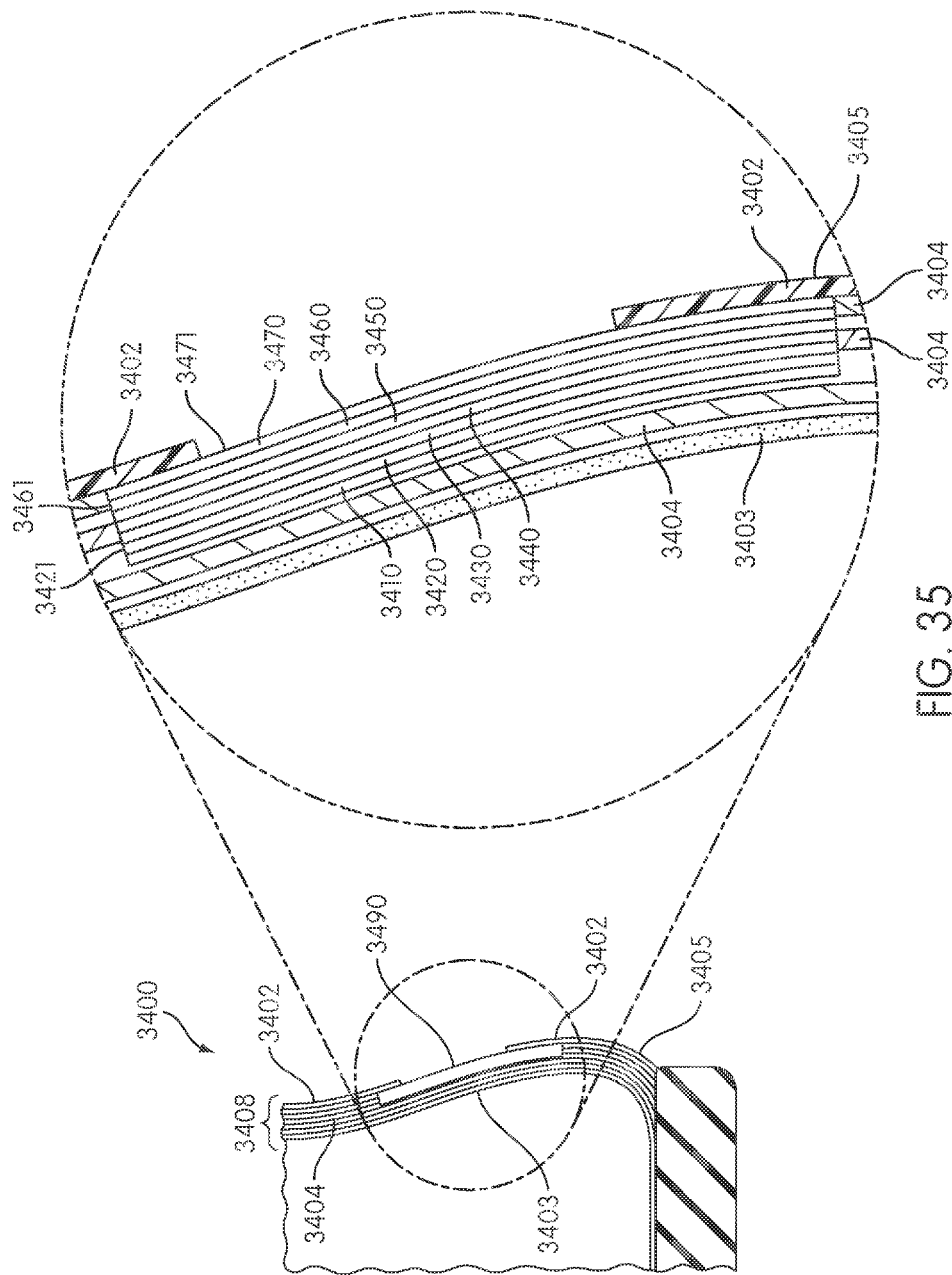

ARTICLE OF FOOTWEAR WITH COLOR CHANGE PORTION AND METHOD OF CHANGING COLOR

CROSS-REFERENCE TO RELATED APPLICATION(S)

This application is a continuation of U.S. application Ser. No. 14/316,255, filed Jun. 26, 2014, which is a continuation-in-part application of U.S. application Ser. No. 14/141,518, filed Dec. 27, 2013, and entitled "COLOR CHANGE SYSTEM FOR AN ARTICLE OF FOOTWEAR WITH A COLOR CHANGE PORTION", which is a continuing application of U.S. Pat. No. 8,650,764, dated Feb. 18, 2014, and entitled "ARTICLE OF FOOTWEAR WITH COLOR CHANGE PORTION AND METHOD OF CHANGING COLOR", which is a continuing application of U.S. Pat. No. 8,474,146, dated Jul. 2, 2013, and entitled "ARTICLE OF FOOTWEAR WITH COLOR CHANGE PORTION AND METHOD OF CHANGING COLOR", the disclosures of which are hereby incorporated by reference in their entireties.

BACKGROUND

The present invention relates generally to an article of footwear, and in particular to an article of footwear with a color changing portion.

Articles associated with regions that change color have been previously proposed. Braynock et al. (U.S. Pat. No. 7,421,806) teaches an article of footwear that is designed to allow a user to change its color. The article of footwear has a transparent panel. The user uses a sock or inner liner between his or her foot and the upper to display whatever color is desirable through the transparent panel.

Brewer (U.S. Pat. No. 5,289,301) teaches a color change article using LCD technology. An LCD panel is incorporated into the upper of an article of footwear. The color of the panel varies depending on the voltage that is transmitted to the LCD panel from a potentiometer. Taylor (U.S. Pat. No. 4,748,366) teaches that electrochromographic materials can be incorporated into footwear along with a piezoelectric power source.

Van Doom (U.S. patent application publication number 2008/0258999) teaches a pair of sunglasses that changes color. A sensor is included on the glasses that can detect the color of a user's clothing and changes the color of an LED embedded in the frame to match. The user can alternatively select a coordinating color manually.

DiBenedetto et al. (U.S. patent application publication number 2007/0000154) teaches an adaptive article of footwear. The footwear incorporates a variety of electrical features, including a sensor. The sensor can measure the degree to which the midsole compresses during a user's use of the article of footwear. The data is stored in a memory system in the article of footwear. The system is designed to function in a self-contained manner or to synchronize to a computer for instructions on how to modify the article of footwear.

There is a need for articles that address the limitations of the related art.

SUMMARY

In one aspect, the invention provides a method of operating an article of footwear with a color change portion, comprising: measuring a performance parameter; coloring the color change portion with a first color when the performance parameter is in a first range of values; coloring the color change portion with a second color when the performance parameter is in a second range of values, the second range of values being substantially different from the first range of values and the second color being substantially different from the first color; and wherein the color change portion comprises an electrochromographic material.

In another aspect, the invention provides a method of operating an article of footwear with a color change portion, comprising: receiving a user selected color; applying an electrical signal to an electrochromographic material associated with the color change portion; and thereby changing the color change portion from an initial color to the user selected color, the initial color being different from the user selected color.

In another aspect, the invention provides a method of operating an article of footwear with a color change portion, comprising: receiving information related to a first color of an object, the object being associated with a user of the article of footwear; determining a second color for the color change portion according to the first color: applying an electrical signal to an electrochromographic material associated with the color change portion; and thereby changing the color change portion to the second color.

In yet another aspect, the invention provides a method of operating an article of footwear with an infrared-reflecting color change portion, the method comprising measuring an infrared radiation parameter; establishing in the infrared-reflecting color change portion a first infrared reflectivity when the infrared radiation parameter is in a first range of values; establishing in the infrared-reflecting color change portion a second infrared reflectivity when the infrared radiation parameter is in a second range of values, the second range of values being substantially different from the first range of values and the second reflectivity being substantially different from the first reflectivity; and controlling the infrared-reflecting color change portion comprising a composite material comprising a photonic lattice including a cross-linked polymeric network by controlling the electronic configuration of the network.

In still another aspect, the invention provides a method of operating an article of footwear with an ultraviolet-reflecting color change portion, the method comprising measuring an ultraviolet radiation parameter; establishing in the ultraviolet-reflecting color change portion a first ultraviolet reflectivity when the ultraviolet radiation parameter is in a first range of values; establishing in the ultraviolet-reflecting color change portion a second ultraviolet reflectivity when the ultraviolet radiation parameter is in a second range of values, the second range of values being substantially different from the first range of values and the second reflectivity being substantially different from the first reflectivity; and controlling the ultraviolet-reflecting color change portion comprising a composite material comprising a photonic lattice including a cross-linked polymeric network by controlling the electronic configuration of the network.

Other systems, methods, features, and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIG. 35 is a cross-sectional view of the embodiment of FIG. 34.

DETAILED DESCRIPTION

Figure 1:
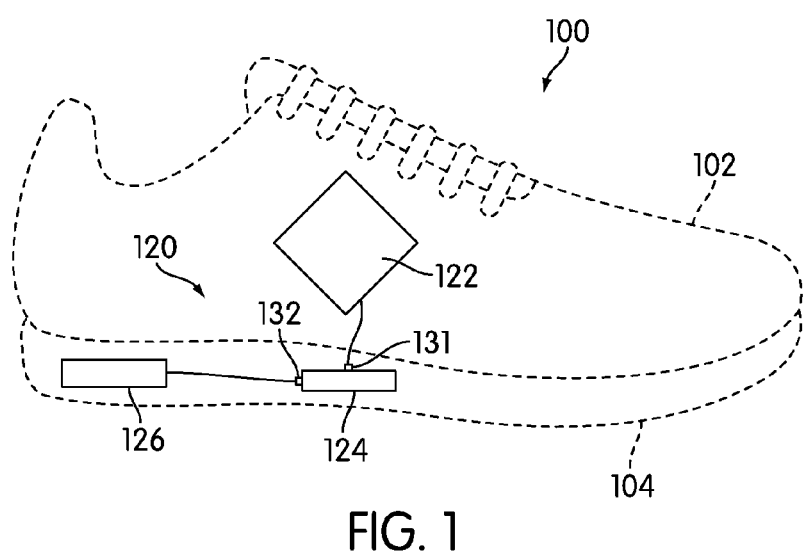
FIG. 1 is schematic view of an embodiment of an article of footwear with a color change portion.

FIG. 1 illustrates a schematic view of an exemplary embodiment of article of footwear 100. For convenience, the disclosure will describe embodiments of the disclosure with detail as they relate to articles of footwear. However, the disclosure contemplates embodiments that include clothing and sporting goods and equipment and related articles, such as but not limited to indicators of progress or accomplishment, speed indicators, and the like.

For clarity, the following detailed description discusses an exemplary embodiment, in the form of a running shoe, but it should be noted that the present invention could take the form of any article of footwear including, but not limited to: hiking boots, soccer shoes, football shoes, sneakers, rugby shoes, basketball shoes, and baseball shoes, as well as other kinds of shoes, such as but not limited to bicycle shoes and ski boots. As shown in FIG. 1, article of footwear 100, also referred to simply as article 100, is intended to be used with a right foot; however, it should be understood that the following discussion may equally apply to a mirror image of article of footwear 100 that is intended for use with a left foot.

Article of footwear 100 may be configured with upper 102 and sole 104. For purposes of clarity, some portions of article 100 are shown in solid lines and others are shown in phantom lines. In addition, the current embodiment illustrates some components of article 100 but may not illustrate all components of article 100.

Article 100 can include color change system 120. The term "color change system" as used throughout this detailed description and in the claims refers to any system capable of providing different colors for one or more portions of article 100. Color change system 120 can comprise color change portion 122. The term "color change portion" as used throughout this detailed description and in the claims refers to any portion of an article that is configured to undergo some type of color change. In embodiments of the disclosure, "color change portion" also includes the ability to reflect infrared or ultraviolet radiation.

The term "color change portion" is not limited to any particular location. A color changing portion can be located on any portion of an article including any portion of an upper, any portion of a sole, as well as other components associated with an article of footwear such as but not limited to shoe laces, straps, liners, or any other component of an article. A color change portion is also not limited to any size and/or shape. In the exemplary embodiment, color change portion 122 is associated with a diamond shaped logo for article 100. However, in other embodiments, a color change portion could be configured with any shape including, but not limited to: stripes, panels, polygons, regular shapes, irregular shapes, as well as any other type of shape. In addition, while a single color changing portion is illustrated in the current embodiment, other embodiments can include two or more color changing portions.

One or more color changing portions can comprise any regions of an article. For example, one embodiment may include an article with trim comprising a color change portion. In another embodiment, a substantial majority of an upper may comprise a color change portion. In a further embodiment, the entire upper of an article of footwear may be formed of a color changing material. In still another embodiment, an upper may comprise distinct panels comprising color change portions. In still another embodiment, a midsole may comprise a color change portion. In still another embodiment, an outsole may comprise a color change portion. In some embodiments, the midsole or the outsole may comprise composite material including photonic crystals or a photonic lattice.

In some embodiments, the article of footwear comprises an upper having one or more distinct color change portions attached to, forming an integral part of, or separate from the upper of the article of footwear. In further embodiments, at least one color change portion may be the upper itself, or a substantial majority of the upper. In other embodiments, the color change portion may be a discrete component or layer attached to the upper. In still other embodiments, the color change portion may be fitted within an aperture in an article of footwear, or may be placed behind an aperture in an article of footwear, where the aperture is smaller than the color change portion. The color change portions of the upper may comprise composite material including photonic crystals or a photonic lattice.

It will be understood that a color change portion can be configured to display more than a single color simultaneously. For example, in some embodiments color change portions may be configured to display patterns and/or graphics. In some embodiments, color change portions may be configured to display numbers. In other embodiments, color change portions may be configured to display words. In other embodiments, color change portions could be configured to display colored stripes and a background color that is different from the stripe color. In still other embodiments, an upper may comprise a single color change portion that is configured to display a first color over the majority of the upper and a second color for a logo on the side of the upper.

In different embodiments, color change portions can be associated with different color change technologies. In particular, the color change portions discussed throughout this detailed description are not limited to use with any specific type of color change technology. Two or more types of color change technologies may be present on the same article.

Examples of color change technologies are known in the art and include, but are not limited to: electrochemical transistor based color change technologies, LCD panel technologies, LED screen technologies, fiber optic technologies, electrochromographic materials (including photonic lattices or crystals), electronic paper technologies (including electrophoretic technologies, electrowetting technologies and electrofluidic technologies), electroluminescent strips, as well as other color change technologies. In another embodiment, color change portions can be associated with electronic paper technologies. Examples are disclosed in U.S. Pat. Nos. 7,535,624; 7,528,822; 7,420,549; 7,167,155; 7,201,952; 6,987,603; 6,922,276; 6,864,875, each of which is hereby incorporated by reference.

In one embodiment, color change portions can be associated with flexible electronic paper technologies that retain color change after removal of applied power. Examples are disclosed in any of the following: U.S. Patent Application Publication Number 2010/0117975, U.S. Patent Application Publication Number 2010/0053724, U.S. Pat. Nos. 7,675,672, 7,195,170, and 6,936,190, the entirety of each being hereby incorporated by reference.

In another embodiment, color change portions can be associated with one or more of organic thin film transistor technologies, organic light emitting diode (OLED) technologies, flexible OLED technologies, as well as other electroluminescent elements. Examples are disclosed in any of the following: U.S. Patent Application Publication Number 2010/0032660, U.S. Patent Application Publication Number 2009/0278449, U.S. Patent Application Publication Number 2007/0222370, U.S. Pat. Nos. 7,075,226, and 6,969,291, the entirety of each being hereby incorporated by reference.

In another embodiment, color change portions can be associated with electronically controllable visually dynamic textiles or flexible substrates as are disclosed in U.S. Patent Application Publication Number 2003/0224155, the entirety of which is hereby incorporated by reference. In another embodiment, color change portions can comprise electroluminescent strips. An example is disclosed in U.S. Patent Application Publication Number 2008/0062677, the entirety of which is hereby incorporated by reference. In still another embodiment, color change portions can comprise electrochromic materials. An example is disclosed in U.S. Patent Application Publication Number 2006/0275660, the entirety of which is hereby incorporated by reference. In addition, any other type of color change technologies can be used including any technologies disclosed in any of the following: U.S. Pat. No. 5,289,301; U.S. Patent Application Publication Number 2006/0221596; U.S. Patent Application Publication Number 2004/0100792; U.S. Patent Application Publication Number 2009/0007458; U.S. Pat. No. 4,748,366; U.S. Patent Application Publication Number 2008/0258999; and U.S. Pat. No. 6,080,690 the entirety of each being hereby incorporated by reference.

In another embodiment, color change portions can be associated with one or more composite materials comprising a photonic lattice. The composite material comprising a photonic lattice that is changed by electrical stimulation may be an electrochromographic material. The photonic lattice also may be known as photonic ink. The photonic lattice may be a colloidal composition comprising polymer and photonic crystals. Photonic crystals also are known as photonic band-gap materials. Photonic band-gap materials are analogous to semiconductors, with the electrons in semiconductors replaced by photons in photonic band-gap material. Creation of periodic structures from materials with contrast in their dielectric constants makes it possible to guide light through the photonic crystal in a manner similar to the way electrons are directed through doped regions of semiconductors. The photonic band-gap precludes reflection of certain light frequencies to yield distinct optical phenomena. Additional information is available in texts directed to the topic. Photonic lattices are tunable to reflect a wavelength. The structure of photonic lattices, and thus the color reflected, may be changed quickly and in small increments to give excellent control over the color reflected. Further, such changes in photonic lattices may be carried out quickly and are predictable. Changes in a photonic lattice also may be predictable, and may minimize color management errors. Predetermined changes in the configuration of the composite material to change the wavelength reflected may be carried out easily.

In some embodiments, the composite materials comprising a photonic lattice are tunable to reflect a selected wavelength within a broad spectral range, including both infrared and ultraviolet, by controlled expansion or contraction of the dimensions of the photonic lattice and resultant precise and predetermined changes to the structure of photonic crystals in the lattice. Such electrochromographic materials may be changed by electrical stimulation, i.e., application of a voltage difference across the crystal or lattice.

In embodiments of the disclosure, the presence and composition of the constituents and the composition of the matrix forming the colloidal composition may establish a range of reflected spectra. By selection of the composition of the colloidal material, radiation in the infrared wavelengths, visible wavelengths, and ultraviolet wavelengths may be reflected from the photonic lattice and thus from the composite material comprising a photonic lattice.

In some embodiments of the disclosure, photonic lattices may comprise an ordered array of microconstituents, such as but not limited to microspheres, in a matrix of cross-linked metallopolymer network with a continuously variable redox state of charge and fluid content. The microconstituents comprise the photonic crystals. The material may be in the form of a continuous or patterned film comprising the lattice. The colloidal material also may be inverted by removing the microspheres from the polymer network to create a macroporous metallopolymeric gel network inverse colloidal photonic lattice that may be similarly tuned.

In some embodiments of the disclosure, the microconstituents may be formed as a thin film on a layer, or may be a monolith into which polymer precursor is infiltrated. Microparticles may be insulators, polymers, metals, or semiconductors, for example. The microconstituent may be cross-linked into the polymer forming the lattice. In embodiments of the disclosure, the microconstituent particles may be spheres, ellipsoids, rods, polyhedra, cubes, and sphere-containing polyhedra, typically having cross-sectional dimensions of between about 60 nanometers and about 100 micrometers.

The polymer network may include cross-linked metallopolymer having a backbone including metal atoms integrated into the polymer backbone and connected directly or through linking units. The cross-linked metallopolymer may have an electronic configuration dependent on the metal atoms. Metal atoms are switchable between or among at least two electronic configurations. The polymer takes up or expels fluid, depending on the electronic configuration of the metals. Fluid uptake expands the polymer and shifts the reflection to longer wavelengths. In electrochromographic photonic lattices, the changes may be affected by applying a voltage difference across the photonic lattice.

In embodiments of the disclosure, switching of this electronic configuration of the colloidal material may be carried out by polarization of outer orbital electrons or by switching between oxidation states. The cross-linked metallopolymer network may be produced containing metal atoms including but not limited to titanium, vanadium, chromium, manganese, iron, cobalt, nickel, copper, niobium, molybdenum, ruthenium, rhenium, platinum, palladium, rhodium, and zinc and combinations thereof. Material may be made from units of metal-containing bridged metallocenophanes containing some of the metals mentioned above, the preferred of these being iron with a silicon atom bridging the two cyclopentadienyl ligands in the case of strained sila-1-ferrocenophanes so that the cross-linked metallopolymer network is comprised of a polyferrocenylsilanes.

Sila-1-ferrocenophanes giving rise to linear metallopolymer are species including, but not limited to, dialkylsila-1-ferrocenophanes, alkylalkoxysila-1-ferrocenophanes, dialkoxysila-1-ferrocenophanes, cycloalkylsila-1-ferrocenophanes, diarylsila-1-ferrocenophanes, alkylarylsila-1-ferrocenophanes, alkylalkenylsila-1-ferrocenophanes, alkylalkynylsila-1-ferrocenophanes or combinations thereof. Sila-1-ferrocenophanes which give rise to a cross-link between polymer chains can include, but are not limited to, cyclobutylsila-1-ferrocenophane, sila-1,1-diferrocenophane, 1,2-bis(methylsila-[1]-ferroceno-phane)acetylene, 1,4-bis(methylsila-M-ferrocenophane)benzene, bis(methylsila-[1]-ferrocenophane)-1,4-diethynylbenzene, and 1,2-bis(methylsila[1]-ferroceno-phane)ethane or combinations thereof. These species may be polymerized thermally, or with a variety of polymerization initiators such as but not limited to transition metal catalysts or carbanions or electromagnetic radiation of various wavelengths.

A cross-linked metallopolymer network may be formed using the above-mentioned metal containing monomers using a mixture of compounds including about 50 wt percent to about 100 wt percent monomer, about 0 wt percent to about 30 wt percent crosslinker, and about 0 wt percent to about 20 wt percent initiator. The resulting network consists of cross-linked polyferrocenyl-silane, with a density of crosslinks controllable by the proportion of crosslinker in the mixture. The porosity of the metallopolymer network may be tuned if the mixture is diluted in an inert substance, such as but not limited to a solvent, which can be removed after polymerization.

Photonic materials, which may be known as photonic lattices, photonic inks, or photonic band gap materials, display color by controlled diffraction. Controlled diffraction is the phenomenon responsible for iridescent color effects found in opals and butterfly wings, for example. As described herein, when light impinges on particles that are stacked or arranged in a pattern, the light may not be perfectly reflected. This same phenomenon may occur when voids in an inverted composition are similarly arranged. This imperfection caused by the particles or voids causes some wavelengths of the light to be eliminated from the reflection. Thus, the reflected light is not perceived as white, but rather is perceived as a color.

It may be particularly convenient to arrange particles, or voids, in a substance such as a polymer, as described herein. Changing the structure may change the perceived color of the reflection. Therefore, changing the diameter of the particles or of the voids may change the perceived color. Similarly, changing the arrangement, such as by changing the spacing between the particles or the voids may change the perceived color. Thus, for a photonic lattice, it may be possible to change the perceived color by changing the shape of the polymer lattice, for example. The lattice may comprise polymers that may include solvent for the polymer.

In embodiments, the perceived color may be changed by applying electrical stimulation in the form of an electrical current or a voltage difference across the material. The electrical stimulation may cause solvent to be absorbed or desorbed by the polymer, thus changing the shape of the polymer to change the perceived color.

Electrical stimulation is not the sole method of changing the structure of a photonic lattice. For example, changes in the structure may be effected by changing pressure or temperature of the material, or by adding or removing chemicals, such as solvents for the polymer, from the system.

These other methods of changing the structure of a photonic lattice may have many techniques by which they are implemented. For example, photonic lattices or crystals that change color with pressure differences may change color when deformed, compressed, or otherwise mechanically changed. Photonic materials may be treated with a solvent or an infiltrate, such as by a stamp or brand to change selected areas, or by treating the bulk of the lattice to change the color completely. This treatment may be effected by electrical stimulation or by addition of solvent. Also, photonic materials that may be modified in other manners also are known.

In exemplary embodiments of the disclosure, a suitable photonic lattice may be changed by electrical stimulation.

In some embodiments, the composite material including a photonic lattice may be used as part of garments or shoes. The color change portion comprising the composite material comprising a photonic lattice can be substantially the entire garment or shoe, or a portion of the garment or shoe. For example, the color change portion may form a trim piece or a decorative portion of the shoe. In other embodiments, a significant portion of a panel may be comprised of the color change portion. In another embodiment, a substantial portion of the entire article of footwear may be comprised of the color change portion.

The color change portion comprising the composite material comprising a photonic lattice can further be an integral part of the garment or shoe, or a detachable portion of the garment or shoe. In some embodiments, the composite material comprising a photonic lattice is used as the material for the upper of shoes. In further embodiments, the garment or shoes may comprise two or more color change portions. For example, the upper of a shoe may be a color change portion. Further, the same shoe may have additional distinct color change portions that are attached to or separate from the shoe upper. Still further, the sole and/or side walls of the sole may comprise composite material comprising a photonic lattice. Each of the color change portions of the shoe, including the upper and sole, may comprise composite material comprising a photonic lattice.

In some embodiments, the color change portion comprises one or more composite materials comprising a photonic lattice. In another embodiment the color change portion comprises a second composite material comprising a photonic lattice. The first composite material comprising a photonic lattice and the second composite material comprising a photonic lattice can be independently electronically addressable. The first composite material comprising a photonic lattice and the second composite material comprising a photonic lattice each can display the same color or a different color in response to an applied electrical potential. Color change portions comprising composite material comprising a photonic lattice can display a still or animated color image.

A color change system can include provisions for powering one or more color change portions. In one embodiment, color change system 120 may include power storage device 126. Generally, power storage device 126 may be any device capable of storing power for color change system 120. In one embodiment, power storage device 126 may be a battery. In some embodiments, power storage device 126 could be a disposable battery. Examples of different types of disposable batteries include, but are not limited to: zinc-carbon, zinc-chloride, alkaline, silver-oxide, lithium disulfide, lithium-thionyl chloride, mercury, zinc-air, thermal, water-activated, nickel oxyhydroxide, and paper batteries. In another embodiment, power storage device 126 could be a rechargeable battery of some kind. Examples of rechargeable batteries include, but are not limited to: nickel-cadmium, nickel-metal hydride, and rechargeable alkaline batteries. In still other embodiments, power storage device 126 could be another type of device capable of generating and storing electricity. For example, in one embodiment, power storage device 126 could be a piezoelectric device capable of generating and storing electricity.

A color change system can include provisions for controlling a color change portion. In one embodiment, color change system 120 may include control unit 124. In some embodiments, a control unit could be a central processing unit (CPU) of some kind. In other embodiments, a control unit could be a simple circuit of some kind for receiving electrical inputs and providing an electrical output according to the inputs. In one embodiment, control unit 124 may be a printed circuit board.

Control unit 124 may include a number of ports that facilitate the input and output of information and power. The term "port" means any interface or shared boundary between two conductors. In some cases, ports can facilitate the insertion and removal of conductors. Examples of these types of ports include mechanical connectors. In other cases, ports are interfaces that generally do not provide easy insertion or removal. Examples of these types of ports include soldering or electron traces on circuit boards.

In the current embodiment, control unit 124 can include port 131 for transmitting and/or receiving information from color change portion 122. In addition, in some cases, port 131 may include provisions for transmitting power to and/or receiving power from color change portion 122. Control unit 124 can include port 132 for transmitting and/or receiving information from power storage device 126. In addition, in some cases, port 132 may include provisions for transmitting power to and/or receiving power from power storage device 126. In an exemplary embodiment, control unit 124 can control color changes in color change portion 122 using energy from power storage unit 126. For example, in one embodiment, control unit 124 may send signals in the form of current changes and/or voltage changes to color change portion 122 to control the color of color change portion 122.

A color change system can include provisions for measuring one or more performance parameters associated with an article of footwear. The term "performance parameter" refers to any type of parameter that can be measured while an article of footwear is worn. For example, the number of heel strikes that occur while an article is worn is a performance parameter that may indicate the distance a user has traveled. As another example, the number of times a sole impacts the ground with a predetermined amount of force is a performance parameter that may indicate the number of times a basketball player jumps during a basketball game. Other performance parameters could include a temperature of a portion of the article, moisture in the article, as well as other possible parameters.

In some embodiments, color change system 122 can be configured with one or more sensors for measuring various performance parameters. Any type of sensors known in the art for measuring force, temperature, moisture as well as any other parameters could be used. In other embodiments, however, provisions for measuring performance parameters could be integrated into control unit 124. For example, in one embodiment, control unit 124 may include a force sensor that measures the number of times a sole impacts the ground. In still other embodiments, provisions for measuring performance parameters could be integrated into power storage device 126. For example, in embodiments where power storage device 126 is a piezoelectric device, the amount of energy generated by the device may be proportional to the number of heel strikes. With this arrangement, control unit 124 could approximately determine the number of steps taken by a user by monitoring the charging level of the piezoelectric device.

Other inputs from sensors may be used to influence the performance or operation of the system. Some embodiments may use one or more of the sensors, features, methods, systems and/or components disclosed in the following documents: Case et al., U.S. Pat. No. 8,112,251, issued Feb. 7, 2012; Riley et al., U.S. Pat. No. 7,771,320, issued Aug. 10, 2010; Darley et al., U.S. Pat. No. 7,428,471, issued Sep. 23, 2008; Amos et al., United States Patent Application Publication 2012/0291564, published Nov. 22, 2012; Schrock et al., United States Patent Application Publication 2012/0291563, published Nov. 22, 2012; Meschter et al., United States Patent Application Publication 2012/0251079, published Oct. 4, 2012; Molyneux et al., United States Patent Application Publication 2012/0234111, published Sep. 20, 2012; Case et al., United States Patent Application Publication 2012/0078396, published Mar. 29, 2012; Nurse et al., United States Patent Application Publication 2011/0199393, published Aug. 18, 2011; Hoffman et al., United States Patent Application Publication 2011/0032105, published Feb. 10, 2011; Schrock et al., United States Patent Application Publication 2010/0063778, published Mar. 11, 2010; Shum, United States Patent Application Publication 2007/0021269, published Jan. 25, 2007; Schrock et al., United States Patent Application Publication 2013/0213147, published Aug. 22, 2013; Schrock et al., United States Patent Application Publication 2013/0213144, published Aug. 22, 2013, where the entirety of each document is incorporated by reference.

A color changing system can include provisions for changing the color of a color change portion to indicate the progress of a user in various athletic activities. In some cases, a control unit can be configured to detect changes in one or more performance parameters that are associated with a particular type of activity. In addition, a control unit can be configured to change the color of a color change portion as a performance parameter reaches a predetermined threshold.

Figure 2:
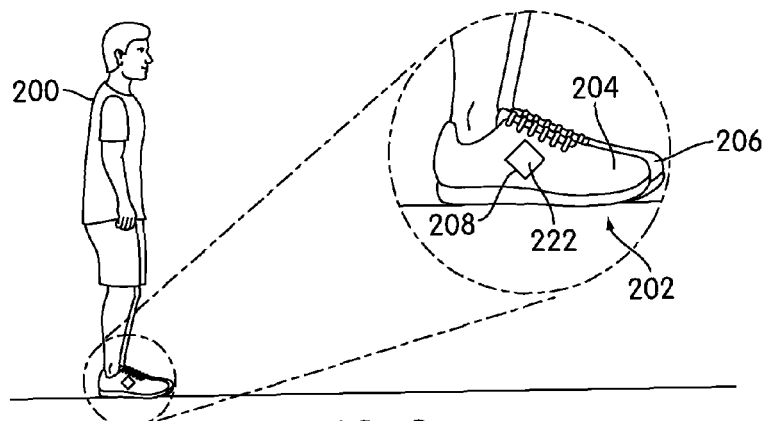
FIG. 2 is a schematic view of an embodiment of a user wearing an article of footwear with a color change portion.
Figure 3:
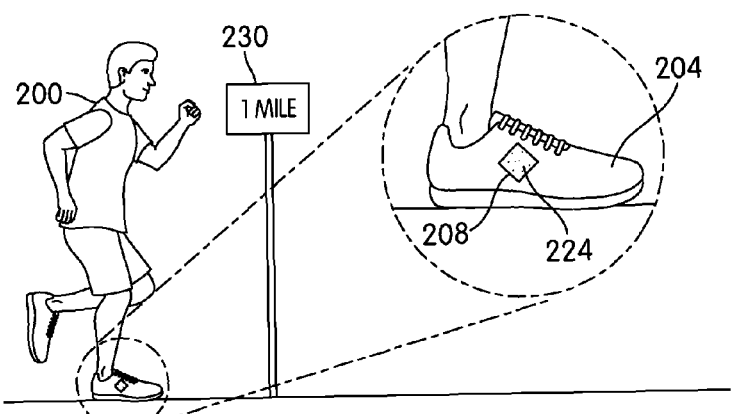
FIG. 3 is a schematic view of an embodiment of a user wearing an article of footwear with a color change portion.
Figure 4:
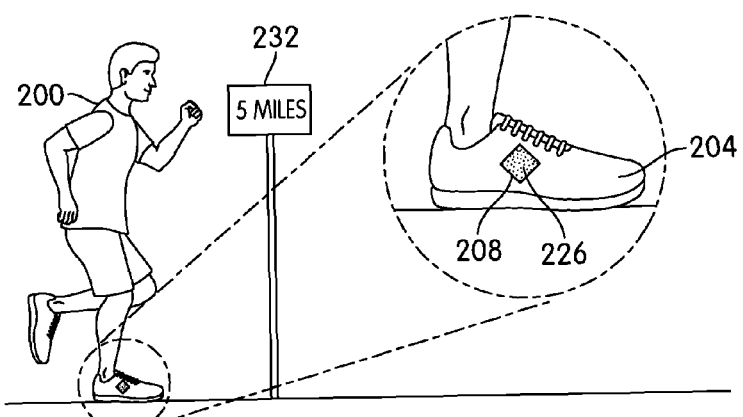
FIG. 4 is a schematic view of an embodiment of a user wearing an article of footwear with a color change portion.

FIGS. 2 through 4 illustrate an embodiment of a user wearing an article with a color change portion. Referring to FIGS. 2 through 4, user 200 is wearing pair of footwear 202. Pair of footwear 202 may comprise first article 204 and second article 206. In some cases, first article 206 may include first color change portion 208. For purposes of clarity, only first article 204 is shown with a color change portion, but it will be understood that in other embodiments second article 206 may also include a similar color change portion.

Initially, before user 200 begins running, first color change portion 208 may be display first color 222. Generally, first color 222 can be any color. In this example, first color 222 could be a white color. At a later time, as user 200 passes one mile marker 230, first color change portion 208 may change from first color 222 to second color 224. In this embodiment, second color 224 could be a yellow color. This transition may occur as a control unit (not shown) of first article 204 determines that user 200 has taken a predetermined number of steps. In some cases, the control unit may be calibrated to change the color of color change portion 122 to a yellow color after approximately 2,000 steps, which roughly corresponds to 1 mile. Following this, as user 200 passes five mile marker 232, color change portion 208 may change from second color 224 to third color 226. In this embodiment, third color 226 could be an orange color. This transition may occur as the control unit of first article 204 determines that user 200 has taken approximately 10,000 steps, which corresponds to approximately 5 miles.

Using this arrangement, a color change portion may be colored to indicate various milestones in the running performance of a user. In the illustrated embodiment, this arrangement could allow user 200 to monitor his or her progress on a run by viewing the color of the color change portion. Also, this arrangement alerts other runners to the progress of user 200. In some cases, the color change portion may function in a similar manner to patches, ribbons, or other objects that are used to visually signify accomplishments in various athletic endeavors.

Figure 5:
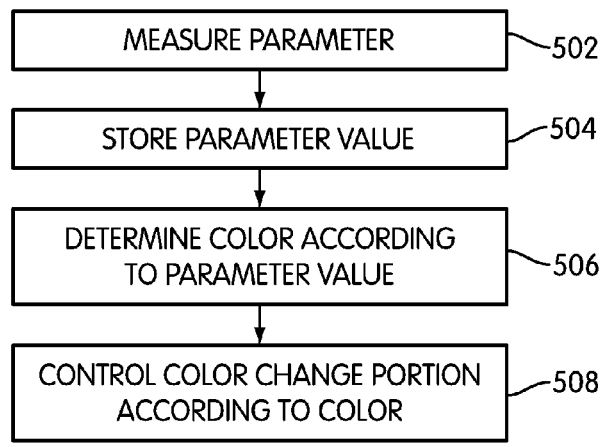
FIG. 5 is an embodiment of a process for controlling a color change portion.

FIG. 5 illustrates an embodiment of a generic process for controlling a color change portion. In this embodiment, the following steps may be performed by control unit 124; however in some embodiments these steps may be performed by additional systems or devices associated with article 100. For example, in some cases including sensors or devices for measuring various performance parameters, one or more steps could be performed by the sensors or devices. In addition, in embodiments where article 124 is in communication with a computer, one or more of the steps could be performed by the computer. In addition, it will be understood that in other embodiments one or more of the following steps may be optional.

During step 502, control unit 124 may measure a performance parameter. The performance parameter could be any parameter including, but not limited to: the number of heel strikes, the number of steps taken, the number of jumps performed, the temperature of a region of the article, the moisture of a region of the article, as well as any other performance parameter. In one embodiment, for example, a piezoelectric device may be used to generate a predetermined amount of electricity with each heel strike. In this embodiment, control unit 124 could be configured to measure the number of heel strikes by determining the total amount of electricity generated by the piezoelectric device. In another embodiment, a stand along sensor could be used for detecting heel strikes or other performance parameters. Next, during step 504, control unit 124 may store the parameter value. In some cases, the parameter value could be stored in memory associated with the control unit. In other cases, the parameter value could be stored in memory associated with a sensor or other device of the article.

Following step 504, control unit 124 may proceed to step 506. During step 506, control unit 124 may determine a color according to the parameter value. In some cases, control unit 124 could assign continuous color values to each parameter value. In other cases, control unit 124 may assign different colors to discrete ranges of a parameter value. For example, in the embodiment discussed above, control unit 124 may use a white color when the number of heel strikes is less than 2,000. Additionally, control unit 124 may use a yellow color when the number of heel strikes is between 2,000 and 10,000. In other embodiments, control unit 124 could determine a color according to the parameter value in any other manner.

Next, during step 508, control unit 508 may control the color change portion according to the color determined during step 506. For example, if during step 506 control unit 124 determines a white color for a parameter value of 1,500 heel strikes, control unit 124 may control the color change portion to have a white color. On the other hand, as the number of heel strikes changes from 1,999 to 2,000 control unit 124 may change the color of the color change portion from white to yellow.

It will be understood that control unit 124 may be configured to control the color of the color change portion using active or passive methods. In some cases, control unit 124 may actively maintain a color for a color change portion by continuously sending electric signals (in the form of currents or voltages) to the color change portion. In other cases, control unit 124 may passively control a color change portion by only sending electric signals to the color change portion when a color change (or color shift) is needed. The use of either passive or active control methods may vary according to the type of color change technology used. For example, when the color change portion comprises a composite material comprising a photonic lattice, an electric signal need be sent only when a color change is needed. This electrochromographic photonic lattice is "bi-stable," i.e., it maintains a color without continuing input of electrical stimulation. In addition, some technologies could make use of a combination of active and passive control methods.

Figure 6:
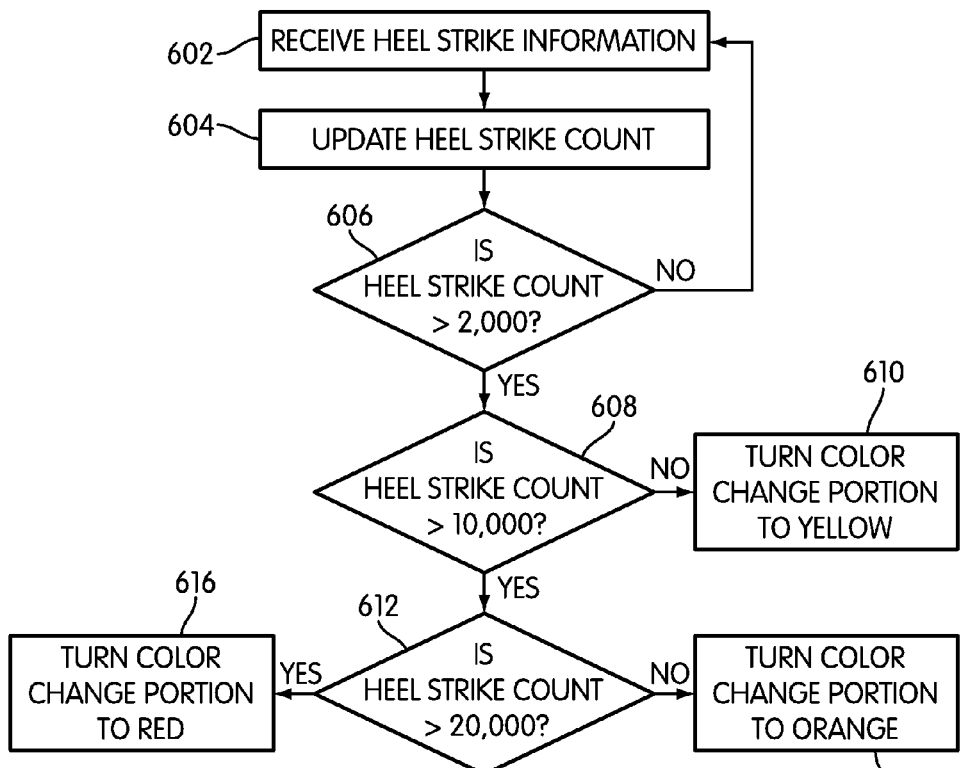
FIG. 6 is an embodiment of a process for controlling a color change portion.

FIG. 6 illustrates an embodiment of a specific method for controlling a color change portion. In particular, FIG. 6 illustrates a method that could be used to control a color change portion in the manner illustrated in FIGS. 2 through 4. In this embodiment, the following steps may be performed by control unit 124; however in some embodiments these steps may be performed by additional systems or devices associated with article 100. For example, in some cases including sensors or devices for measuring various performance parameters, one or more steps could be performed by the sensors or devices. In addition, in embodiments where article 124 is in communication with a computer, one or more of the steps could be performed by the computer. In addition, it will be understood that in other embodiments one or more of the following steps may be optional.

During step 602, control unit 124 may receive heel strike information. In particular, control unit 124 could receive information related to a heel strike event. In some cases, heel strike information can be received from a stand alone heel strike sensor. In other cases, heel strike information can be received from a power storage device, such as piezoelectric device that may be configured to generate power during heel strikes. In still other cases, heel strike information can be received from any other device capable of measuring heel strike information.

Following step 602, during step 604, control unit 124 may update a heel strike count, which is a variable that keeps track of the total number of heel strike events that have occurred. Next, during step 606, control unit 124 may determined if the heel strike count is greater than 2,000. If the heel strike count is less than 2,000, control unit 124 may return to step 602 to receive new heel strike information. If, however, the heel strike count is greater than 2,000, control unit 124 may proceed to step 608. During step 608, control unit 124 may determine if the heel strike count is greater than 10,000. If so, control unit 124 may proceed to step 612. Otherwise, control unit 124 may proceed to step 610. During step 610, control unit 124 turns the color change portion to yellow. In situations where the color is already yellow, no color change may occur and control unit 124 may continue to operate the color change portion in a yellow color state. If however, the color is not initially yellow, control unit 124 changes the color change portion to a yellow color.

During step 612, control unit 124 determines if the heel strike count is greater than 20,000. If not, control unit 124 proceeds to step 614. During step 614, control unit 124 turns the color change portion to an orange color. If, during step 612, control unit 124 determines that the heel strike count is greater than 20,000, control unit 124 may proceed to step 616, where control unit 124 turns the color change portion to a red color.

It will be understood that in other embodiments, different threshold values could be selected. As discussed above, the exemplary embodiment uses heel strike thresholds of 2,000, 10,000, and 20,000 corresponding to approximately 1 mile, 5 mile, and 10 mile distances. In other embodiments, however, a color change portion may change color according to any other threshold values. In other cases, for example, a color change portion may be configured to change color after every 1,000 heel strikes. In still other cases, a color change portion may be configured to change color after every 100,000 heel strikes.

Figure 7:
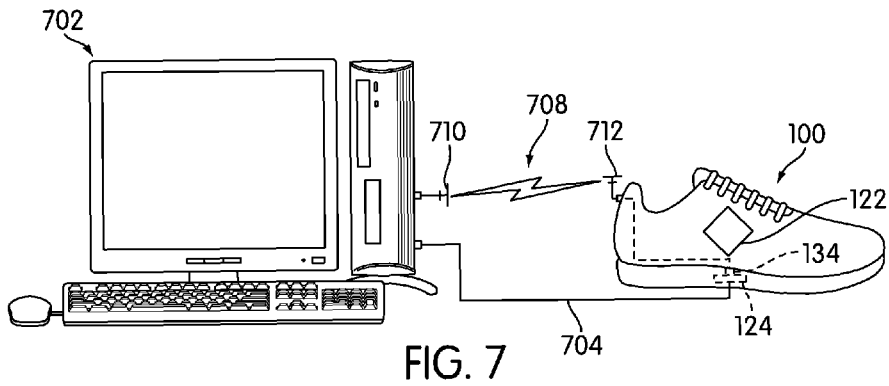
FIG. 7 is a schematic view of an embodiment of an article with a color change portion in communication with a computer.
Figure 8:
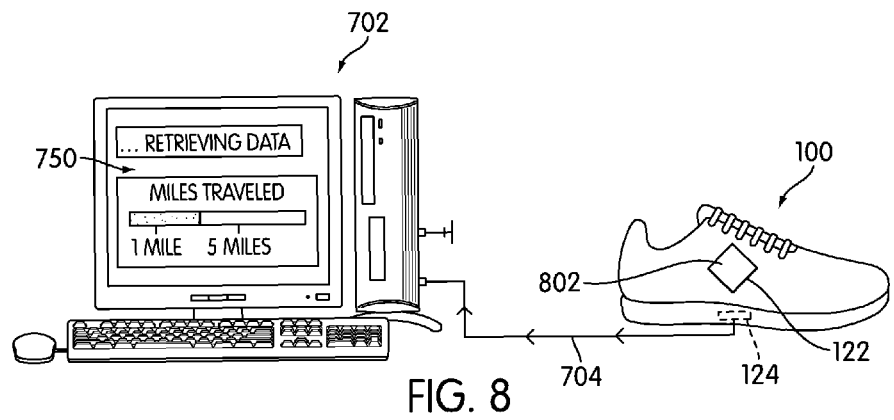
FIG. 8 is a schematic view of an embodiment of an article with a color change portion in communication with a computer.
Figure 9:
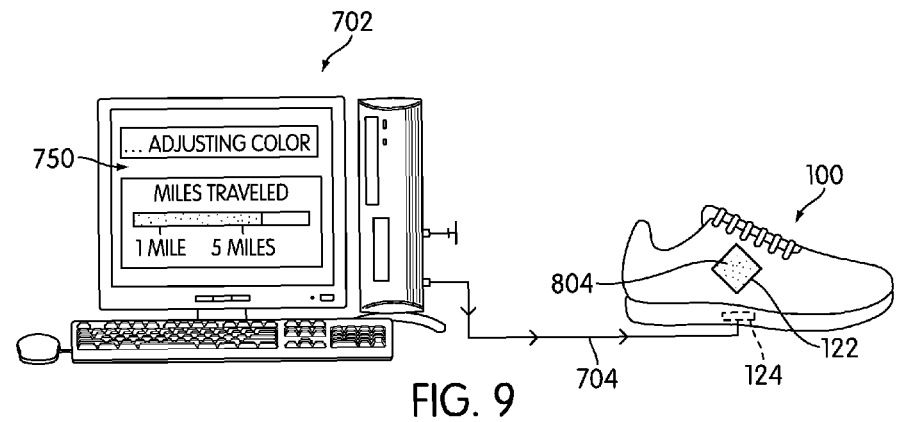
FIG. 9 is a schematic view of an embodiment of an article with a color change portion in communication with a computer.

FIGS. 7 through 9 illustrate embodiments of a system for controlling a color change portion using a computer or similar device. Referring to FIGS. 7 through 9, article 100 may be connected directly to computer 702. Generally, computer 702 could be any type of computing device including, but not limited to a desktop computer or a laptop computer. In addition, the term computer can also include any other device that includes a display and a processor. Examples of such devices include, but are not limited to: PDAs tablet computers, and cell phones, as well as other types of devices.

In some embodiments, article 100 may be connected to computer 702 using wired connection 704. Generally, wired connection 704 can be any cable or collection of wires that can be used to exchange information between article 100 and computer 702. In addition, wired connection 704 may be configured to transfer power between article 100 and computer 702. In some cases, wired connection 704 could be used to charge a power storage device of article 100. Furthermore, wired connection 704 could be associated with any type of connection. For example, in one embodiment, wired connection 704 could be a USB cable that can be used to exchange information between computer 702 and article 100 as well as to provide power to article 100. In other cases, any other type of connection could be used. For example, in another embodiment, an IEEE 1394 interface (a fire wire) could be used for data transfer.

In some embodiments, article 100 may be connected to computer 702 using wireless connection 708. In some cases, computer 702 may include first antenna 710 for transmitting and receiving information. In addition, in some cases, article 100 may include second antenna 712 for transmitting and receiving information. It will be understood that second antenna 712 is optional and may not be included in all embodiments. Furthermore, in embodiments where an antenna is used with article 100, control unit 124 may include a port for transmitting information to and/or receiving information from the antenna. In the current embodiment, control unit 124 includes port 134 that is in communication with second antenna 712.

Generally, wireless connection 708 could be any type of wireless connection supporting any type of wireless communication. In some cases, computer 702 and article 100 may communicate using a wireless network. Examples of such networks include, but are not limited to: personal area networks, local area networks, wide area networks, client-server networks, and peer-to-peer networks, as well as other types of networks. In other cases, wireless connection 708 could utilize the Bluetooth wireless protocol. In still other cases, wireless connection 708 may use other short range wireless technologies such as wireless USB.

For purposes of clarity, article 100 and computer 702 are shown as being disposed adjacent to one another in the current embodiment. In other embodiments, however, article 100 may be remotely connected to computer 702 using a wireless network. Moreover, in some cases, article 100 could be connected to computer 702 using a packet-switched communication system such as the Internet.

In some embodiments, a color change system can be associated with a software interface that may be run on a computer. The term "software interface" refers to any computer program or collection of computer programs that may be used as an interface for inputting information to, or receiving information from, a color change system. In some cases, software for interfacing with a color change system could be stored on a computer. In other cases, software for interfacing with a color change system could be associated with a control unit for an article that is accessed through a computer when the article is connected to the computer. This arrangement allows software for interfacing with a color change system to be used with any computer that is capable of connecting with the article.

In some embodiments, a color change system can include provisions for automatically controlling a color change portion whenever an article is connected to a computer. In one embodiment, for example, a computer may be configured to download information related to a performance parameter and control the color change portion according to the value of the performance parameter.

Referring to FIGS. 8 and 9, article 100 may be connected to computer 702 using wired connection 704. As article 100 is connected to computer 702, computer 702 may be configured to automatically download information related to one or more performance parameters. In the exemplary embodiment, computer 702 may download information from control unit 124 related to heel strikes, which may be used to estimate the number of miles traveled by the user. Initially, when article 100 is first connected, the number of miles traveled is between 1 mile and 5 miles. In some cases, this information could be displayed using software interface 750. At this point, color change portion 122 has first color 802. Once the performance parameter information is fully downloaded, computer 702 displays an updated record of the miles traveled using software interface 750. In this case, the user has traveled over 5 miles. Therefore, computer 702 sends a signal to control unit 124 to change color change portion 122 to second color 804. Thereafter, a user may disconnect article 100 and color change portion 122 may continue to display second color 804.

Using the arrangement illustrated in FIGS. 8 and 9, color change portion 122 may be automatically controlled using computer 702. In some cases, this system can help reduce the computational power required by control unit 124. This arrangement could save manufacturing costs since the primary computational power is performed by computer 702 rather than control unit 124.

In some embodiments, a color change system can include provisions for manually controlling a color change portion. In some cases, an article can be associated with one or more control buttons that are used to manually control colors of a color change portion. In addition, in some cases, an article can be associated with a reset button that resets the value of a performance parameter. For example, a user may want to restart tracking his or her performance. One or more control buttons could be provided directly on a portion of an article with a color change portion or they could be provided on a remote control that is in communication with a control unit of the color change system. In addition, provisions for manually controlling a color change system could be provided as part of a software interface for the color change system. For example, in embodiments where color change is controlled by a computer, a software interface can include provisions for clearing or resetting a performance parameter.

A color change system can include provisions for increasing the level of control over a color change portion. In some cases, an article including a color change portion can be controlled according to various types of external input. In some cases, the input may be received directly from a user. In other cases, the input could be received from other sources.

Figure 10:
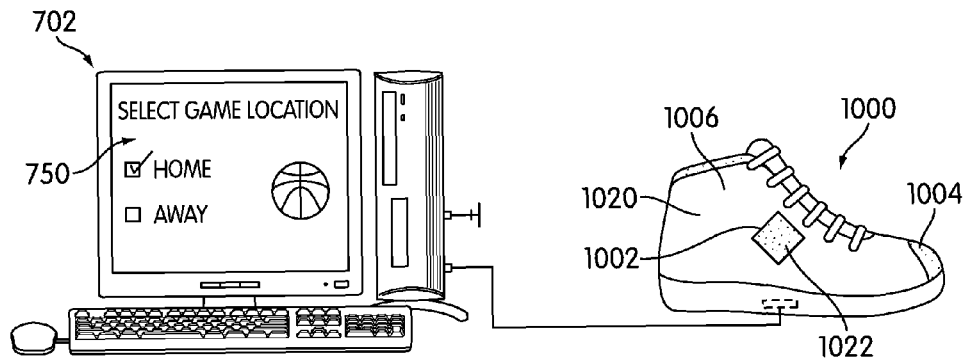
FIG. 10 is a schematic view of an embodiment of an article with a color change portion in communication with a computer.
Figure 11:
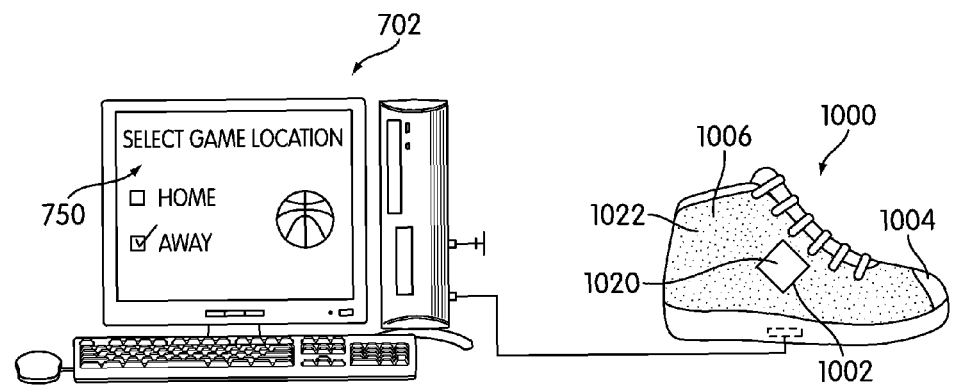
FIG. 11 is a schematic view of an embodiment of an article with a color change portion in communication with a computer.

FIGS. 10 through 11 illustrate an embodiment of a color change portion that is controlled according to user input information. Referring to FIGS. 10 and 11, article 1000 may be a basketball shoe. In addition, article 1000 includes first color change portion 1002 in the form of a logo as well as second color change portion 1004 in the form of trim. Furthermore, article 1000 includes third color change portion 1006 that comprises the substantial majority of the upper. As previously discussed, each color change portion can be configured with various colors, including patterns and/or patterns.

In some embodiments, the upper of article 1000 may be formed of composite material comprising a photonic lattice. In other words, third color change portion 1006 may be the upper itself, or a substantial majority of the upper. In other embodiments, third color change portion 1006 may be a discrete component or layer attached to the upper. Further, in some embodiments, third color change portion 1006 may be formed of composite material comprising a photonic lattice.

Similarly, first color change portion 1002 may be formed of the upper material itself, or it may be a discrete component or layer attached to the upper. In some embodiments, first color change portion 1002 may be formed of composite material comprising a photonic lattice. Also, second color change portion 1004 may be formed of the upper material itself, or it may be a discrete component or layer attached to the upper. In some embodiments, second color change portion 1004 may be formed of composite material comprising a photonic lattice.

In this case, article 1000 is connected to computer 702. In this embodiment, computer 702 may prompt a user to select the type of game location for an upcoming basketball game that the user will attend. Referring to FIG. 10, the user may select "home" using software interface 750, indicating that the game is a home game. Since home teams traditionally wear white, computer 702 may send a control signal to article 1000 to color third color change portion 1006 with first color 1020. In the exemplary embodiment, first color

1020 may be a white color. In addition, computer 702 may control first color change portion 1002 and second color change portion 1004 to display second color 1022. In some cases, second color 1022 could be a non-white color. For example, if the basketball team of the user has red as a team color, second color 1022 could be red. With this arrangement, the majority of article 1000 may be colored white while the logo and trim may be colored with a team color.

Referring to FIG. 11, at another time, if a user selects "away" using software interface 750, indicating that the game is an away game, computer 702 may control third color change portion 1006 to have second color 1022. In addition, computer 702 may control first color change portion 1002 and second color change portion 1004 to have first color 1022. With this arrangement, the majority of article 1000 may be colored with a team color while the logo and trim may be colored white.

A color change system can include provisions for applying user selected colors and/or predetermined designs to an article including one or more color change portions. In some embodiments, a color change system may include provisions for allowing a user to input a user selected color. Upon receiving the user selected color, a control unit may be configured to change the color change portion to the user selected color. For example, in embodiments where an electrochromographic material is used with the color change portion, a control unit may apply a predetermined current and/or voltage to the color change portion to change the color of the color change portion from an initial color to the user selected color. In other embodiments, a color change system may include provisions for applying multiple colors to one or more color change portions according to a design for an article of footwear that incorporates multiple colors.

Figure 12:
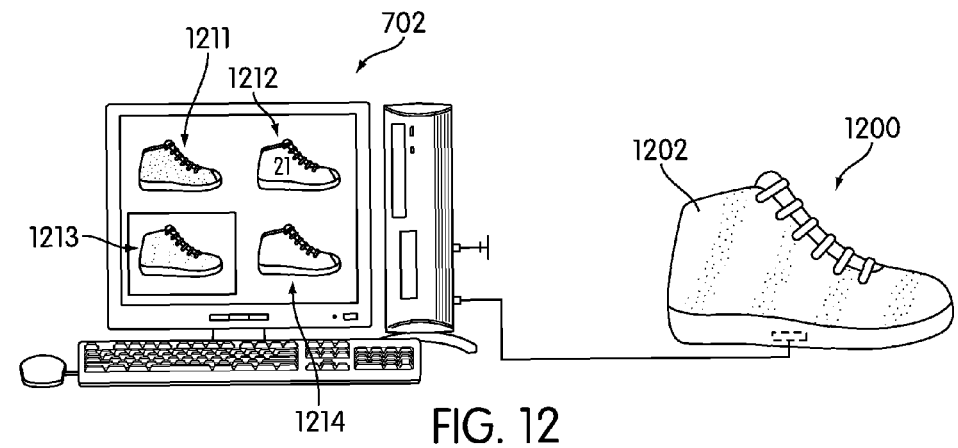
FIG. 12 is a schematic view of an embodiment of an article with a color change portion in communication with a computer.

Referring to FIG. 12, article 1200 includes color change portion 1202 that comprises a substantial majority of the upper. In some embodiments, the upper of article 1200 may be formed of color change portion 1202. In other embodiments, color change portion 1202 may be a discrete component or layer attached to the upper. In further embodiments, color change portion 1202 may comprise composite material comprising a photonic lattice.

As shown in FIG. 12, article 1200 is connected to computer 702. In this case, a user may be presented with four predetermined designs including first design 1211, second design 1212, third design 1213, and fourth design 1214. In this case, a user has selected third design 1213 that comprises a stripe-like pattern. As the user selects third design 1213, computer 702 may send a control signal to article 1200 that colors color change portion 1202 with the selected design. In particular, in embodiments where a color change portion comprises an electrochromographic material, a control unit may send an electrical signal to color change portion 1202 to change one or more colors of color change portion 1202 so that color change portion 1202 is configured to the selected design.

Although only four designs are illustrated in this embodiment, other embodiments could include additional designs. In some cases, designs can be imported into software interface 750 manually by a user. In other cases, designs could be included in a software package. In still other cases, a user could create a design using any type of graphic software.

It will be understood that a color change portion may not be restricted to the upper of an article. In other cases, a color change portion could be associated with any other portion of an article. For example, in some cases, a sole of an article may comprise one or more color change portions that allow the color of the sole to be varied. In other cases, lacing associated with an article could be configured with a color change portion so that the color of the lacing can be varied. In still other embodiment, any other portions of an article could be associated with color change portions. As another example, in some cases, an insert for an article could comprise one or more color change portions.

Figure 13:
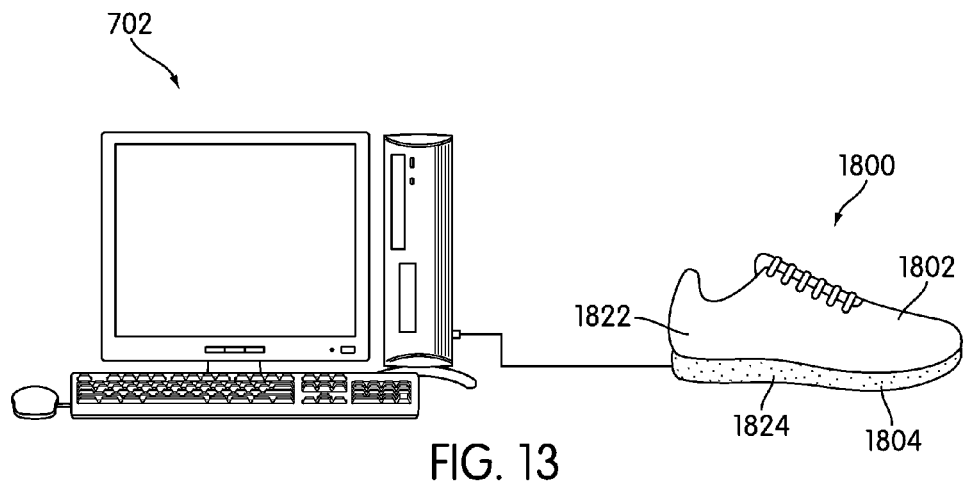
FIG. 13 is a schematic view of an embodiment of an article with a color change portion in communication with a computer.

Referring to FIG. 13, article 1800 includes upper 1802 and sole 1804. In addition, article 1800 includes first color change portion 1822 and second color change portion 1824. First color change portion 1822 may comprise a substantial majority of upper 1802. In some embodiments, the upper of article 1800 may be formed of first color change portion 1822. In other embodiments, first color change portion 1822 may be a discrete component or layer attached to the upper. In some embodiments, first color change portion 1822 may comprise composite material comprising a photonic lattice. Furthermore, second color change portion 1824 may comprise a substantial majority of sole 1804. In some embodiments, second color change portion 1824 may be the sole of article 1800, or a discrete component or layer attached to the sole. In some embodiments, second color change portion 1824 may comprise composite material comprising a photonic lattice. With this configuration, first color change portion 1822 and second color change portion 1824 can be used to change the colors of a substantial entirety of article 1800.

Figure 14:
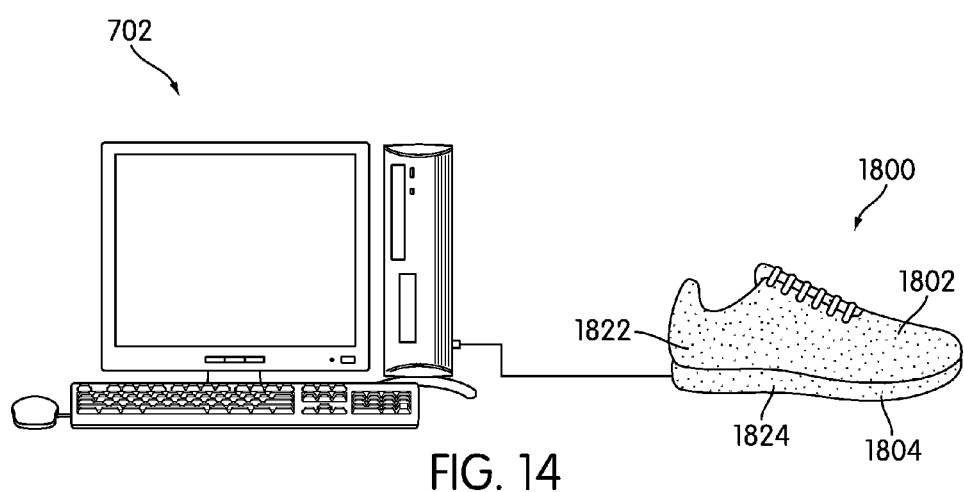
FIG. 14 is a schematic view of an embodiment of an article with a color change portion in communication with a computer.

In some cases, as shown in FIG. 13, second color change portion 1824 may be colored differently from first color change portion 1822. As shown in FIG. 14, however, in some cases, first color change portion 1822 and second color change portion 1824 could have substantially similar colors. This arrangement provides a user with the ability to change substantially any portion of article 1800. Furthermore, it will be understood that in other cases, different regions of first color change portion 1822 and second color change portion 1824 could have different colors.

A color change system can include provisions for automatically coloring an article according to information received about other objects that may be worn or otherwise associated with a user. In some embodiments, a color change system can include provisions for receiving information related to a first color of an object associated with the user. In addition, a color change system can include provisions for determining a second color for the color change portion according to the first color. For example, in some cases, a color change system can determine a second color that color coordinates with the first color. In embodiments where the color change portion comprises an electrochromographic material, a control unit may send an electrical signal to the color change portion to change the color of the color change portion to the second color.

In some cases, a color change system may receive information about the color of one or more articles configured to be worn by a user and may determine a color for a color change portion according to the colors of the other articles.

Figure 15:
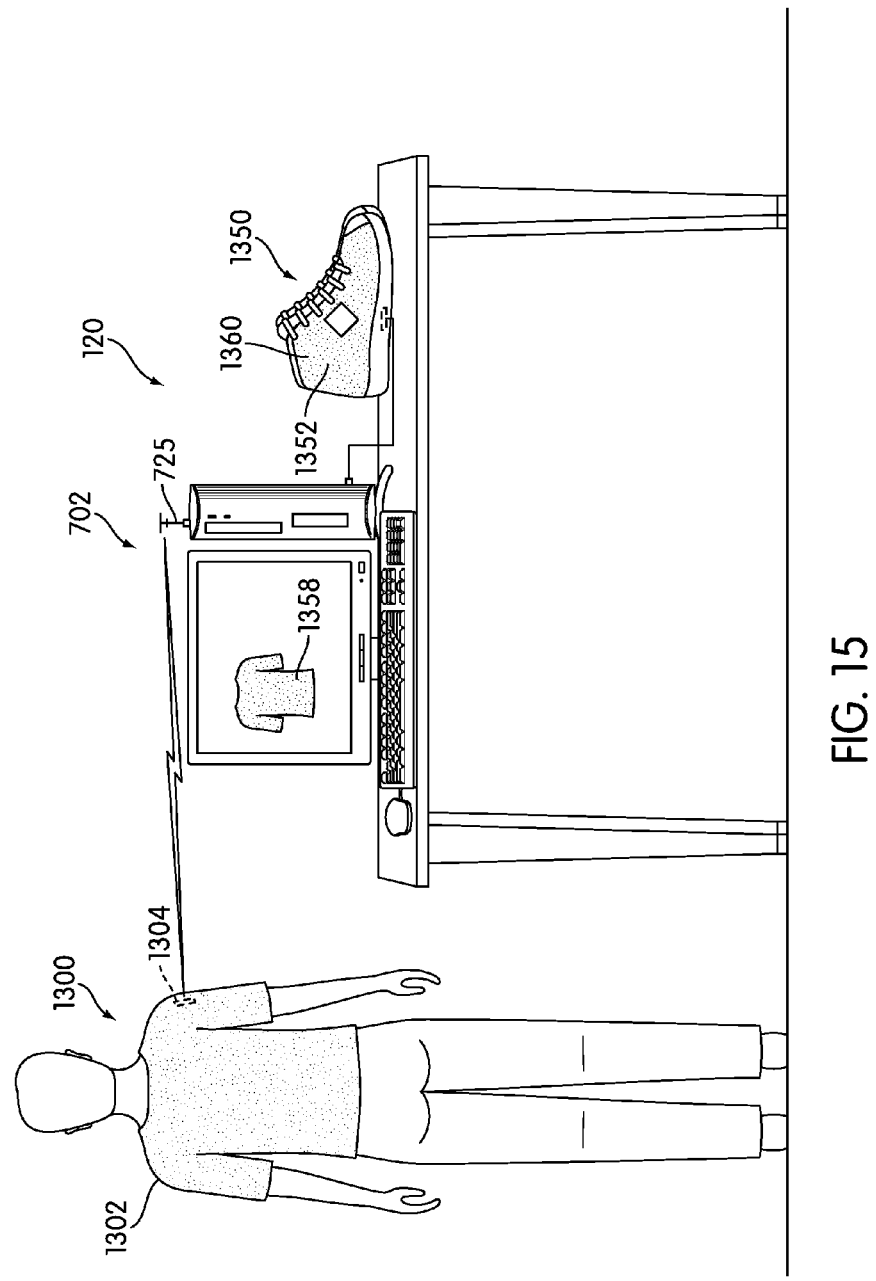
FIG. 15 is a schematic view of an embodiment of a method of detecting an article of clothing for use with a color change system.

FIG. 15 illustrates an embodiment of color change system 120. Referring to FIG. 15, user 1300 may wear shirt 1302. In some cases, shirt 1302 may be equipped with electronic identification device 1304. The term "electronic identification device" refers to any object applied to or incorporated into an article for purposes of identifying the object. As an example, in some cases, electronic identification device 1304 could be a radio-frequency identification (RFID) tag. In cases where electronic identification device 1304 is an RFID tag, electronic identification device 1304 could be either an active tag or a passive tag.

In this case, computer 702 may be equipped with antenna 725 that is capable of receiving a transmission from device 1304. Computer 702 may use the signal received from electronic identification device 1304 to identify shirt 1302. In particular, the identifying information may include the type of article as well as the color of the article. In this case, computer 702 determines that shirt 1302 is associated with first color 1358. Following this, computer 702 may determine a coloring scheme for article 1350 that coordinates with first color 1358. In this case, computer 702 selects second color 1360 for article 1350 that will color coordinate with shirt 1302. In particular computer 702 controls color change portion 1352 to change to second color 1360. In embodiments where color change portion 1352 comprises an electrochromographic material, a control unit associated with color change portion 1352 may apply an electrical signal to color change portion 1352 to change color change portion 1352 to second color 1360. With this arrangement, a user can easily color coordinate his or her shoes with other articles of clothing being worn. It will be understood that while the current embodiment discusses coordinating the color of an article of footwear with a shirt, other embodiments could include provisions for coordinating footwear colors with any other articles including, but not limited to: shirts, pants, socks, hats, scarves as well as accessories or other objects that may be worn or carried. Examples of other objects that could be coordinated include, but are not limited to: any type of equipment, such as sporting equipment, back packs, bags, luggage, as well as any other objects for which it may be desirable to color coordinate.

Figure 16:
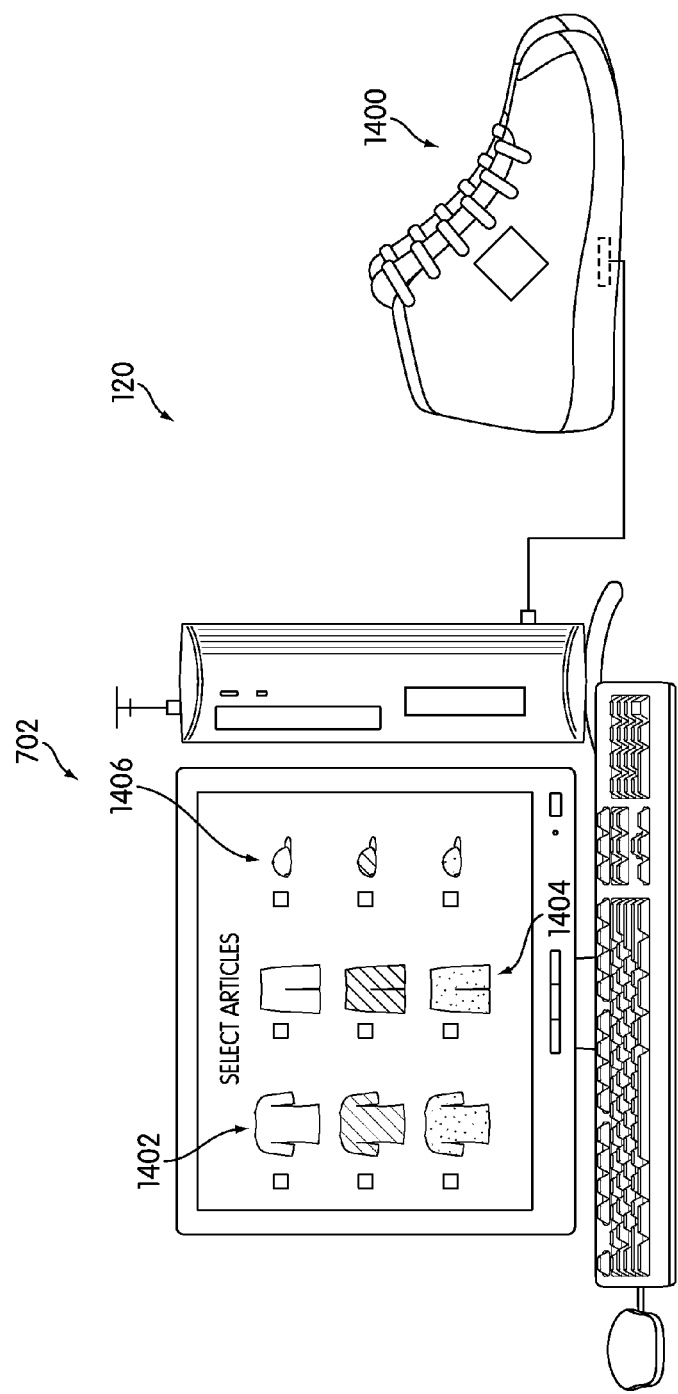
FIG. 16 is a schematic view of an embodiment of a method of selecting articles of clothing for purposes of controlling a color change system.

Referring to FIG. 16, a user can manually select articles from a list of articles for purposes of coordinating with footwear. In this embodiment, a user may select articles from shirt list 1402, pant list 1404, and hat list 1406. After a user has selected one or more articles to be worn, color change system 120 may be configured to automatically change one or more color change portions of article 1400 to coordinate with the selected articles.

The list of articles discussed in this embodiment could be generated in any manner. In some cases, a user could manually create a list of articles. In one embodiment, a color change program could include general article categories such as shirts, pants, and hats. Within each category, a user could create an entry for each article owned and assign a color to each entry. For example, a user could create a first entry for a short sleeve t-shirt and select the color for the shirt manually. This could be accomplished by any method including having the user select the color from a color chart or having the user scan a portion of the article in using a scanner. In another embodiment, a list of articles could be generated by having a user scan in the bar codes from sales tags of newly purchased articles. In still another embodiment, articles could be provided with other tags or information that can be scanned in or manually entered into a color change program by a user. In still other embodiments, a user may have access to a database of various clothing articles from different manufacturers.

Figure 17:
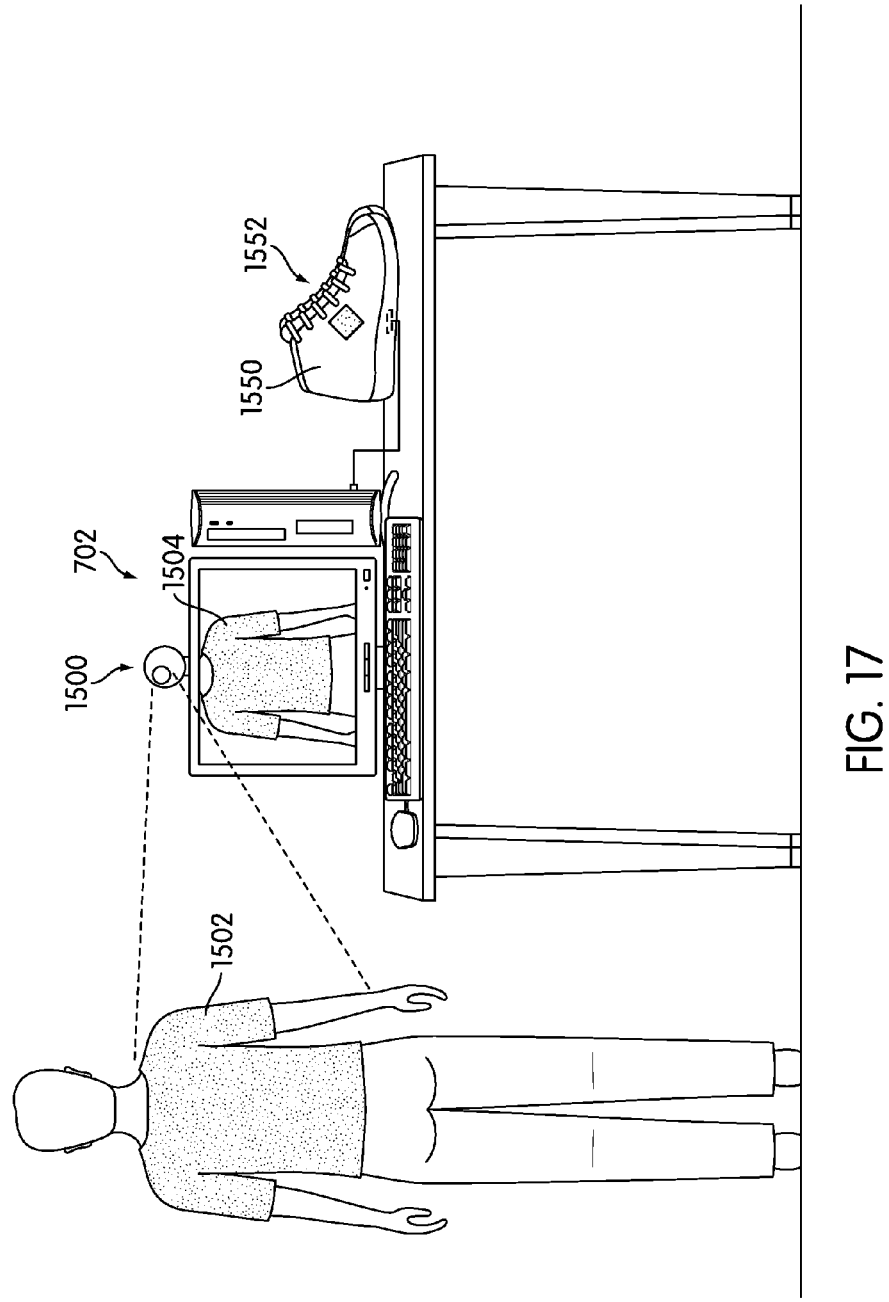
FIG. 17 is a schematic view of an embodiment of a method of detecting an article of clothing for purposes of controlling a color change system.

FIG. 17 illustrates an embodiment of another method of determining the color of clothing worn by a user. Referring to FIG. 17, computer 702 may be equipped with camera 1500. Generally, camera 1500 can be any type of imaging device configured to communicate with computer 702 including a digital camera, a camcorder, a scanner, as well as any other imaging device. In an exemplary embodiment, camera 1500 may be a web-cam.

In this case, a user may have a picture taken of shirt 1502 using camera 1500. This picture may be stored on computer 702 as image 1504. In addition, computer 702 may be configured to analyze image 1504 to determine the color of the clothing. For example, computer 702 may determine that shirt 1502 has a red color. Using this information, computer 702 could control color change portion 1550 of article 1552 to have a red color to match shirt 1502.

It will be understood that the embodiments discussed above are not intended to be limited to use with particular types of sensors for identifying clothing color. In other embodiments, other types of sensors can be used for detecting colors of clothing worn by a user.

A color change system may be configured to automatically determine one or more colors for a color change portion of an article of footwear according to the colors of various other articles of clothing worn by a user. In some embodiments, a color change system may color a color change portion with the same colors used in one or more articles of clothing worn by a user. In other embodiments, however, a color change system may use different colors from the colors detected in one or more articles worn by a user. In some cases, for example, a color change system may color a color change portion with a coordinating color that matches colors in other articles worn by the user. In other cases, a color change system may purposefully select clashing colors for a color change portion that do not match with colors in other articles worn by the user. In still other cases, a color change system can use any rules for determining one or more colors for a color change portion according to the colors of other articles worn by a user.

A color change system can be associated with one or more color designs. The term "color design" refers to any collection of information that can be used by a color change system to determine how to color one or more color change portions of an article. In some cases, color designs could be stored in standardized file formats that could be easily read by software associated with a color change system. By using standardized file formats color designs could be easily created by third parties and exchanged between different users. In other embodiments, however, a color design may not be associated with a standardized format and could generally include information regarding specific colors to use for various color change portions on an article of footwear.

Figure 18:
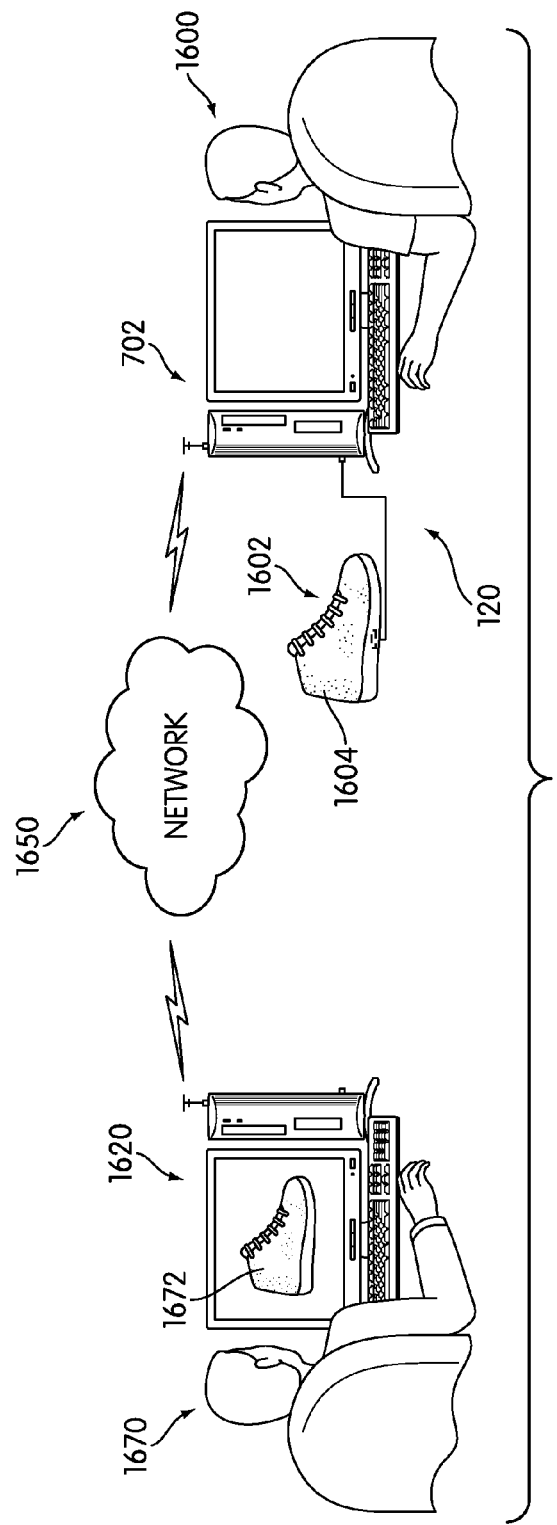
FIG. 18 is a schematic view of an embodiment of a method of transferring color designs using a color change system.

A color change system can include provisions for allowing a second party to create a color design and send a color design to a user with an article having a color change portion. Referring to FIG. 18, user 1600 has access to computer 702 and article 1602. Article 1602 further includes color change portion 1604 that comprises a substantial majority of the upper of article 1602. In addition, computer 702 is in communication with remote computer 1620 via network 1650.

Generally, network 1650 may be a system allowing for the exchange of information between computer 702 and remote computer 1620. Examples of such networks include, but are not limited to: personal area networks, local area networks, wide area networks, client-server networks, peer-to-peer networks, as well as other types of networks. Additionally, the network may support wired transmissions, wireless transmissions, or both wired and wireless transmissions. In some embodiments, network 1650 may be a packet-switched communications system. In a preferred embodiment, network 1650 may be the Internet.

In some embodiments, designer 1670 may use remote computer 1620 to create a color design for an article with a color change portion. In one example, designer 1670 could be a professional designer. With this arrangement, designer 1670 may submit color design 1672 for an article to user 1600 via network 1650. Upon receiving color design 1672, color change system 120 may be configured to automatically color article 1602 according to color design 1672.

Figure 19:
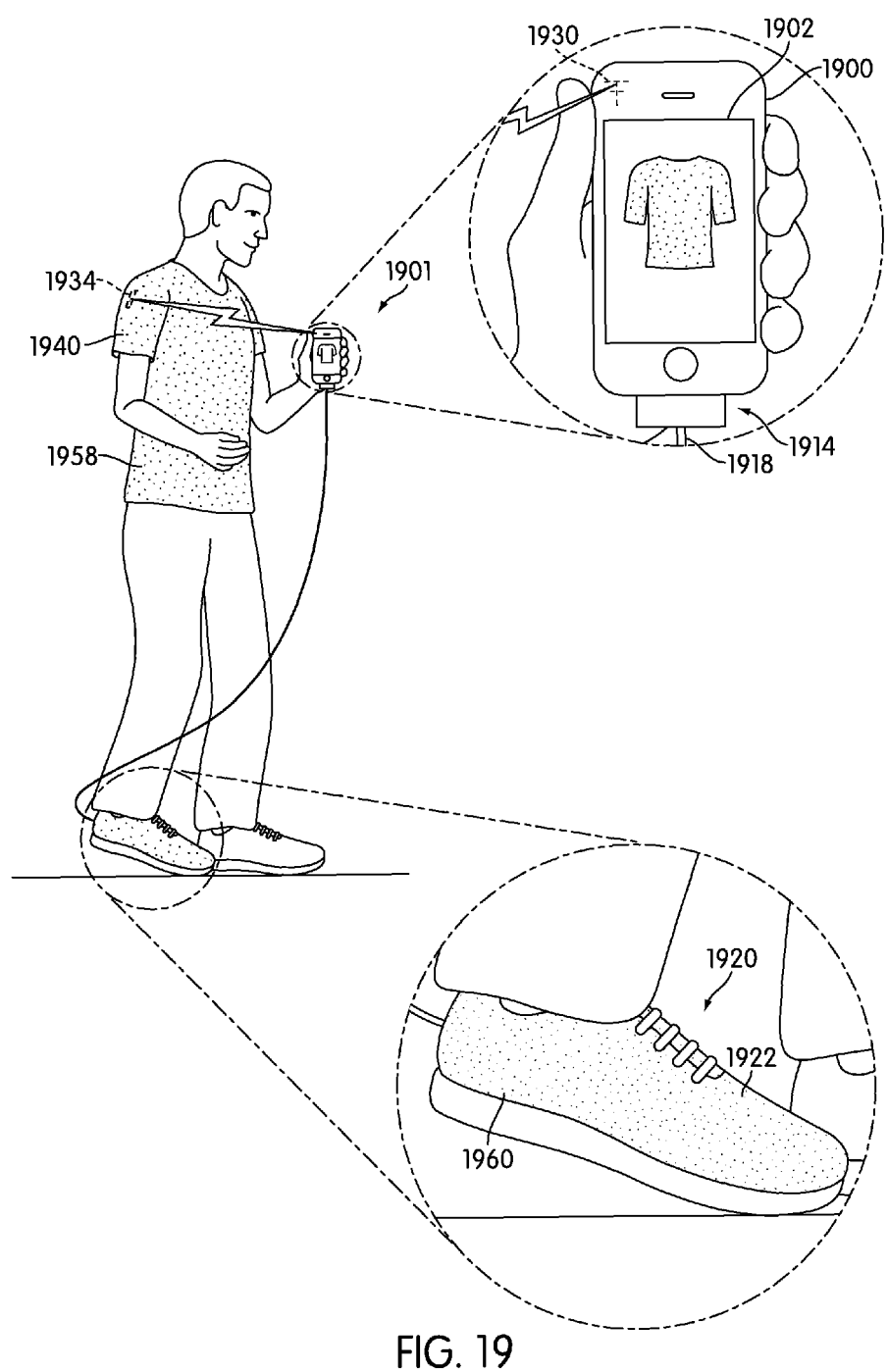
FIG. 19 is a schematic view of an embodiment of a method of detecting an article of clothing for use with a color change system using a mobile device.

FIG. 19 illustrates a schematic view of an embodiment of color change system 1901 that utilizes one or more features of mobile device 1900. Generally, a mobile device could be any device that is portable and that may be used by an athlete or user to obtain training instructions. Examples of different mobile devices include, but are not limited to: mobile phones, digital music players, portable digital assistants (PDAs), portable gaming machines, tablet computers, and ultraportable laptops, as well as any other kinds of mobile devices. In the exemplary embodiment, mobile device 1300 may be an iPad, iPhone, or iPod manufactured by Apple Computer, Inc.

Mobile device 1900 can be configured with display screen 1902. Also, mobile device 1900 can include input button 1904. Furthermore, in some cases, mobile device 1900 can be configured with a touch-sensitive screen. In other cases, mobile device 1900 can include any other input devices. It will be understood that mobile device 1900 can include various other provisions including speakers, a microphone, ports for syncing and/or powering mobile device 1900, a headphone jack, as well as various other provisions which are not visible in FIG. 19.

Mobile device 1900 can be configured to run one or more software applications. In some cases, software applications can be provided on mobile device 1900 at the time of manufacturing. In other cases, software applications can be downloaded from a service provider. In one exemplary embodiment, a user may purchase an application from an online retail store such as iTunes.

In the current embodiment, mobile device 1900 may include antenna 1930 that may be utilized for transmitting and receiving information. In some cases, antenna 1930 may be capable of receiving information from electronic identification device 1934 of shirt 1940. In some cases, electronic identification device 1934 could be a radio-frequency identification (RFID) tag.

Mobile device 1900 may also be connected to article of footwear 1920. In some cases, mobile device 1900 may be connected to article 1920 using wired connection 1918. In particular, mobile device 1900 includes port 1914 for receiving information from article 1920 via wired connection 1918. In other cases, however, mobile device 1900 may be in communication with article 1920 in any other manner, including wireless connections.

In the current embodiment, mobile device 1900 may use the signal received from electronic identification device 1934 to identify shirt 1940. In particular, the identifying information may include the type of article as well as the color of the article. In this case, mobile device 1900 determines that shirt 1934 is associated with first color 1958. Following this, mobile device 1900 may determine a coloring scheme for article 1920 that coordinates with first color 1958. In this case, mobile device 1900 selects second color 1960 for article 1920 that will color coordinate with shirt 1940. In particular, mobile device 1900 controls color change portion 1922 to change to second color 1960. In embodiments where color change portion 1922 comprises an electrochromographic material, a control unit associated with color change portion 1922 may apply an electrical signal to color change portion 1922 to change color change portion 1922 to second color 1960. This arrangement may increase the mobility of color change system 1901.

In some embodiments, mobile device 1900 can include additional provisions for sensing information about an article. In some cases, for example, mobile device 1900 could include an optical device for sensing optical information about an article. Examples of different optical devices that may be incorporated into a mobile device include, but are not limited to: a digital camera, a video camera, a scanner, as well as any other imaging device.

Figure 20:
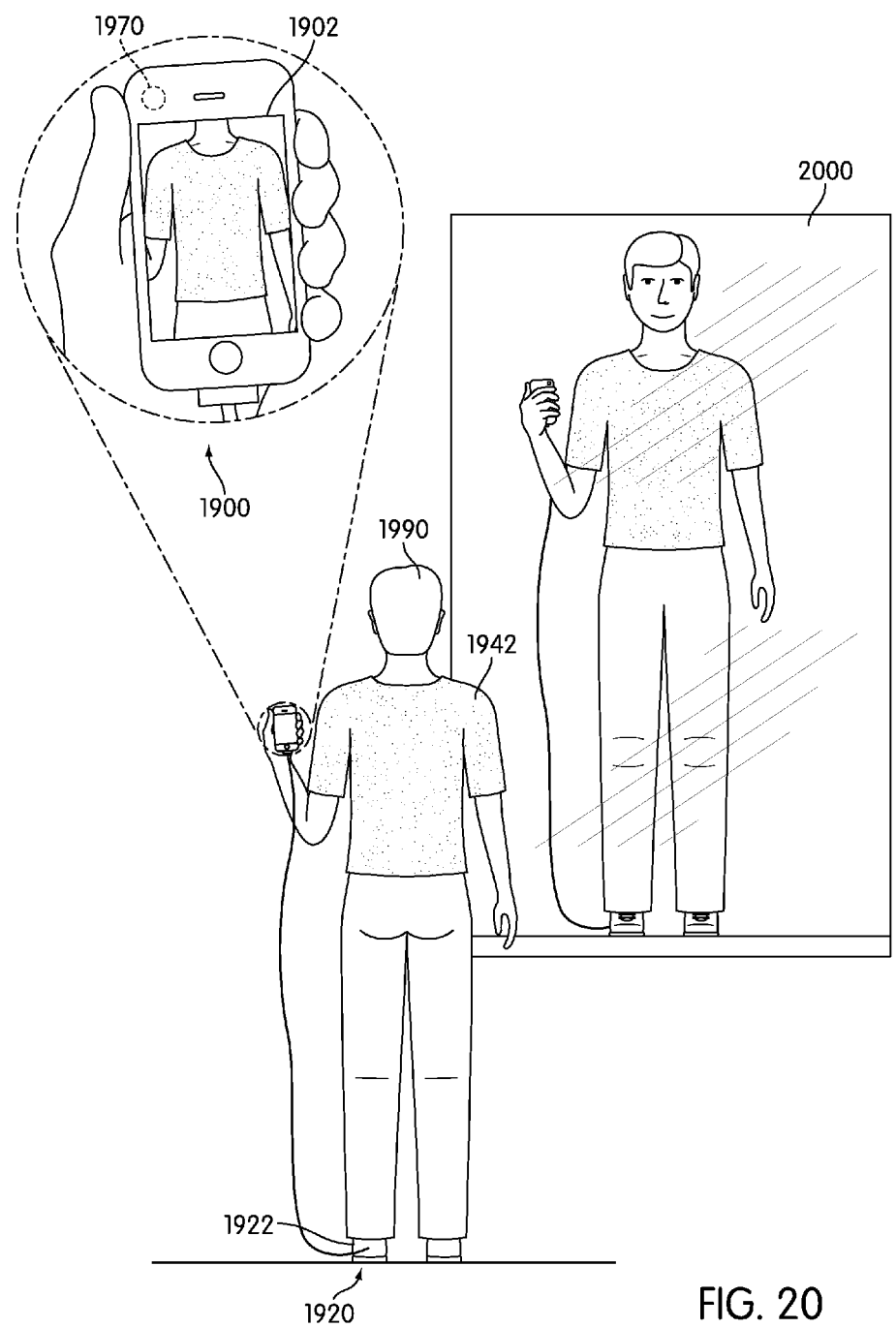
FIG. 20 is a schematic view of an embodiment of a method of detecting an article of clothing for use with a color change system using a mobile device.

Referring to FIG. 20, mobile device 1900 may be configured with camera 1970. In different embodiments, the location of camera 1970 can vary. In the current embodiment, camera 1970 may be disposed on a side of mobile device 1900 that is opposite of display screen 1902. In this case, user 1990 may take a picture of shirt 1942 in mirror 2000 using mobile device 1900. Mobile device 1900 may then analyze the picture of shirt 1942 to a coordinating color for color change portion 1922.

A color change system can include provisions for operating in various power modes. In some embodiments, a color change system may be configured to operate in a high power mode when an article is connected directly to an external power source. In addition, a color change system may be configured to operate in a low power mode when an article is connected to an internal power source only. In addition, a high power mode may be a mode in which a color change system applies color changes quickly in a color change portion due to an abundance of power. In contrast, a low power mode may be a mode in which a color change system applies color changes slowly or simply maintains colors for a color change portion due to a limited supply of power. In embodiments of the disclosure comprising a composite material comprising a photonic lattice, power is not required to maintain a color. This arrangement may be useful for conserving power in embodiments where color changing technologies are used that have relatively high power requirements, or, or example, to apply color changes quickly.

Figure 21:
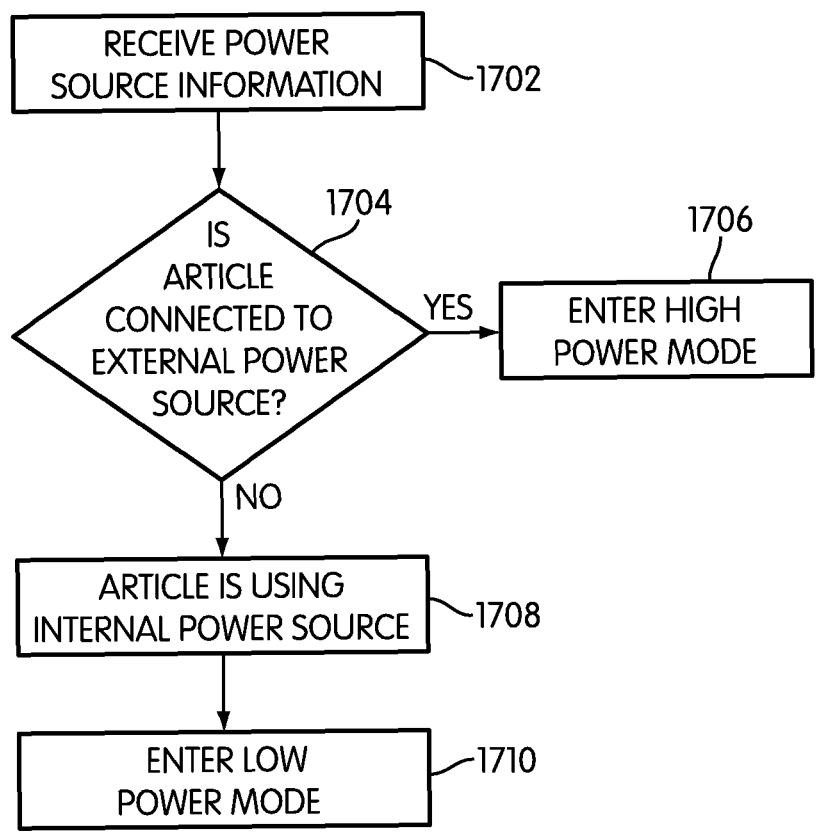
FIG. 21 is an embodiment of a process for controlling a color change system.

FIG. 21 illustrates an embodiment of a process for operating a color change system in various power modes. In this embodiment, the following steps may be performed by control unit 124; however in some embodiments these steps may be performed by additional systems or devices associated with article 100. For example, in some cases including sensors or devices for measuring various performance parameters, one or more steps could be performed by the sensors or devices. In addition, in embodiments where article 124 is in communication with a computer, one or more of the steps could be performed by the computer. In addition, it will be understood that in other embodiments one or more of the following steps may be optional.

During first step 1702, control unit 124 may receive power source information. Generally, any method known in the art for detecting power source information can be used. Next, during step 1704, control unit 124 may determine if the article is connected to an external power source. If so, control unit 124 may proceed to step 1706 and enter a high power mode. During the high power mode, control unit 124 may change the colors of one or more color change portions rapidly, due to the greater availability of power for operating the color change portions.

If, during step 1704, control unit 124 determines that the article is not connected to an external power source, control unit 124 may proceed to step 1708. During step 1708, control unit 124 may determine that the article is using an internal power source. Examples of internal power sources are discussed above and include any types of batteries and/or piezoelectric devices, as well as other types of portable power sources. Following step 1708, control unit 124 may proceed to step 1710 and enter a low power mode. During the low power mode, control unit 124 may change the colors of one or more color change portions slowly in order to preserve power. In some cases, color changes may not occur during low power mode and instead low power mode may be reserved for actively or passively maintaining a particular color for a color change portion. In embodiments of the disclosure comprising a composite material comprising a photonic lattice, power is not required to maintain a color.

Figure 22:
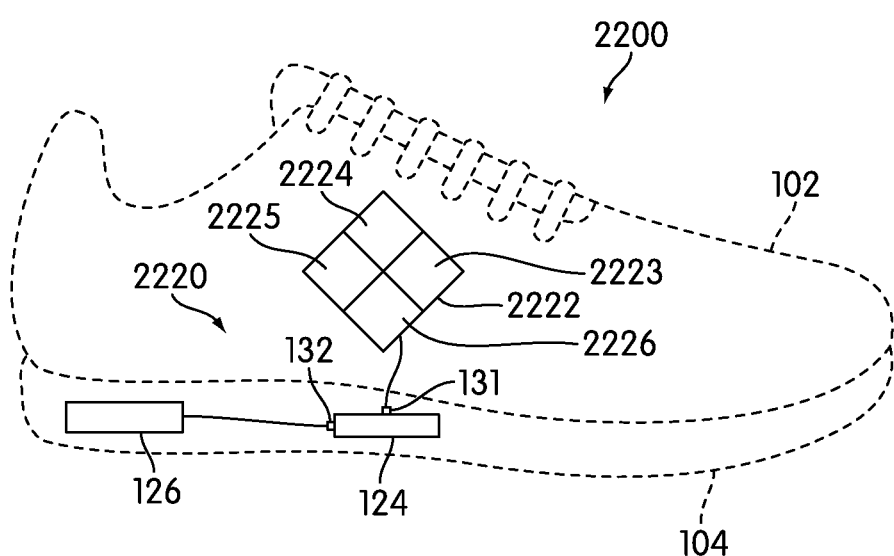
FIG. 22 is an alternate exemplary embodiment of an article of footwear with a color change portion.

Referring now to FIG. 22, an alternate exemplary embodiment of an article of footwear 2200 is illustrated. Article 2200 may include one or more components that are substantially similar to components associated with article 100, described above, including, but not limited to upper 102 and/or sole 104. In some embodiments, article 2200 may include a color change system 2220. Color change system 2220 may include one or more components that are substantially similar to components associated with color change system 120, discussed above, including, but not limited to: control unit 124, power storage device 126, port 131, and/or port 132. In an exemplary embodiment, color change system 2220 may include a color change portion 2222. Color change portion 2222 may be substantially similar to color change portion 122, discussed above.

In some embodiments, color change system 2220 may include color change portion 2222 associated with multiple individual color change portions. In an exemplary embodiment, color change portion 2222 may include a first color change portion 2223, a second color change portion 2224, a third color change portion 2225, and/or a fourth color change portion 2226. Each of first color change portion 2223, second color change portion 2224, third color change portion 2225, and/or fourth color change portion 2226 may be comprised of an individual color change portion substantially similar to color change portion 122, discussed above. In some embodiments, control unit 124 may control each of first color change portion 2223, second color change portion 2224, third color change portion 2225, and/or fourth color change portion 2226 separately. In other embodiments, control unit 124 may control color change portion 2222 as a single component.

In an exemplary embodiment, color change portion 2222, including any of first color change portion 2223, second color change portion 2224, third color change portion 2225, and/or fourth color change portion 2226 may be associated with an electronic paper technology. In one embodiment, first color change portion 2223, second color change portion 2224, third color change portion 2225, and/or fourth color change portion 2226 may comprise individual tiles that together form color change portion 2222. With this arrangement, individual tiles of electronic paper may be arranged to form a larger color change portion on an article. In some cases, a substantially rigid electronic paper may be associated with any of first color change portion 2223, second color change portion 2224, third color change portion 2225, and/or fourth color change portion 2226. In embodiments where substantially rigid electronic paper is used, a tiled arrangement may provide flexibility to color change portion 2222. In other cases, a substantially flexible electronic paper and/or any other color change technology discussed herein may be associated with any of first color change portion 2223, second color change portion 2224, third color change portion 2225, and/or fourth color change portion 2226.

Figure 23:
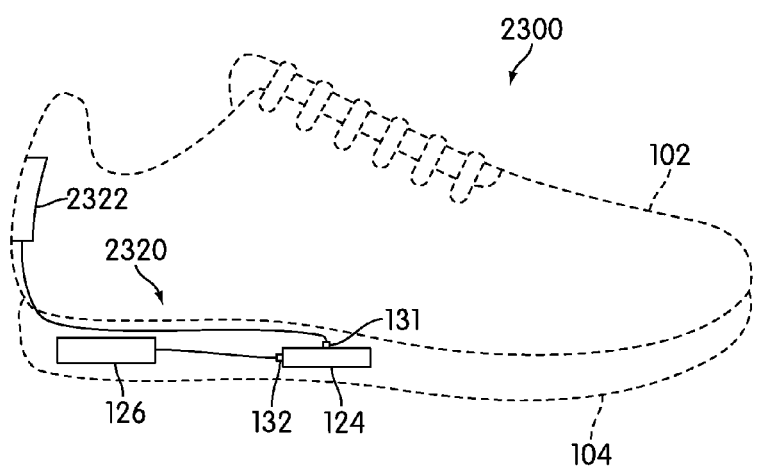
FIG. 23 is an alternate exemplary embodiment of an article of footwear with a color change portion.
Figure 24:
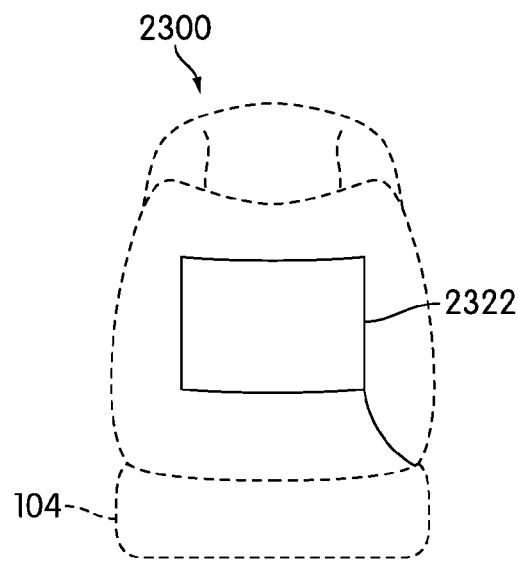
FIG. 24 is a rear view of an alternate exemplary embodiment of an article of footwear with a color change portion.

In other embodiments, a color change system may be associated with a curved portion of an article of footwear. Referring now to FIGS. 23 and 24, an alternate exemplary embodiment of an article of footwear 2300 is illustrated. Article 2300 may include one or more components that are substantially similar to components associated with article 100, described above, including, but not limited to upper 102 and/or sole 104. In some embodiments, a color change system 2320 may be associated with a curved portion of article 2300. For example, in one embodiment, color change system 2320 may be associated with a portion of article 2300 associated with a heel of a user. Color change system 2320 may include one or more components that are substantially similar to components associated with color change system 120, discussed above, including, but not limited to: control unit 124, power storage device 126, port 131, and/or port 132. In an exemplary embodiment, color change system 2320 may include a curved color change portion 2322. Curved color change portion 2322 may be substantially similar to color change portion 122, discussed above.

In one embodiment, curved color change portion 2322 may be associated with one or more curved portions of article 2300. In an exemplary embodiment, curved color change portion 2322 may be associated with a portion of the heel of article 2300. As shown in FIG. 24, curved color change portion 2322 may wrap around a portion of the heel of article 2300. In some cases, a substantially flexible electronic paper technology or composite materials comprising a photonic lattice, i.e., technologies that retain color change after removal of applied power, may be associated with curved color change portion 2322. In embodiments where a substantially flexible electronic paper technology or composite materials comprising a photonic lattice are used, curved color change portion 2322 may be configured to substantially conform to the curved shape of the heel of article 2300. In other cases, any other flexible color change technology discussed herein may be associated with curved color change portion 2322.

Figure 25:
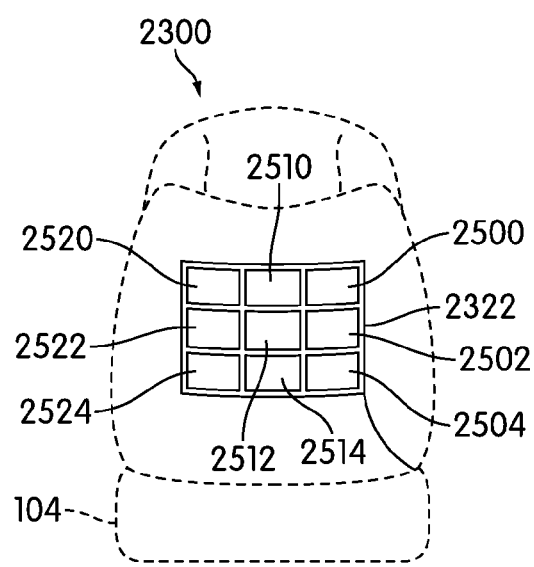
FIG. 25 is a rear view of an alternate exemplary embodiment of an article of footwear with a color change portion.

In some embodiments, curved color change portion 2322 may be associated with multiple individual color change portions. As shown in FIG. 25, an alternate exemplary embodiment of curved color change portion 2322 may be associated with a plurality of individual color change portions arranged in a tiled configuration. In one embodiment, curved color change portion 2322 may include a first color change portion 2500, a second color change portion 2502, a third color change portion 2504, a fourth color change portion 2510, a fifth color change portion 2512, a sixth color change portion 2514, a seventh color change portion 2520, an eighth color change portion 2522, and/or a ninth color change portion 2524. Each individual color change portion forming curved color change portion 2322 may be substantially similar to any of first color change portion 2223, second color change portion 2224, third color change portion 2225, and/or fourth color change portion 2226, described above. In addition, control unit 124 may control each of the plurality of individual color change portions separately, or curved color control portion 2322 as a single component, as described in reference to FIG. 22.

In some embodiments, one or more of individual color change portions of curved color change portion 2322 may be arranged in groups. In one embodiment, groups may be associated with a row or column in a tiled arrangement of individual color change portions. In some cases, various groups may be associated with different color change technologies.

For example, in one embodiment, a first group of individual color change portions including first color change portion 2500, second color change portion 2502, and third color change portion 2504 may be associated with a curved portion of the heel of article 2300 on one side. Similarly, a second group of individual color change portions including seventh color change portion 2520, eighth color change portion 2522, and ninth color change portion 2524 may be associated with a curved portion of the heel of article 2300 on the opposing side. A third group of individual color change portions including fourth color change portion 2510, fifth color change portion 2512, and sixth color change portion 2514 may be associated with a center portion of the heel between the first group and the second group. In this embodiment, the first group may be associated with a composite material comprising a photonic lattice and the second group may be associated with a substantially flexible electronic paper, while the third group may be associated with a substantially rigid electronic paper. With this arrangement, curved color change portion 2322 may be configured to substantially conform to the curved shape of the heel of article 2300.

In other embodiments, curved color change portion 2322 may be associated with a plurality of individual color change portions of a substantially similar color change technology, including, but not limited to any one or more of a substantially rigid electronic paper, a substantially flexible electronic paper, composite material comprising a photonic lattice, and/or any other color change technology discussed herein or developed in the future. In various embodiments, any one or combination of a substantially rigid electronic paper, a substantially flexible electronic paper, composite material comprising a photonic lattice, and/or any other color change technology discussed herein or developed in the future may be associated with any of first color change portion 2500, second color change portion 2502, third color change portion 2504, fourth color change portion 2510, fifth color change portion 2512, sixth color change portion 2514, seventh color change portion 2520, eighth color change portion 2522, and/or ninth color change portion 2524.

Figure 26:
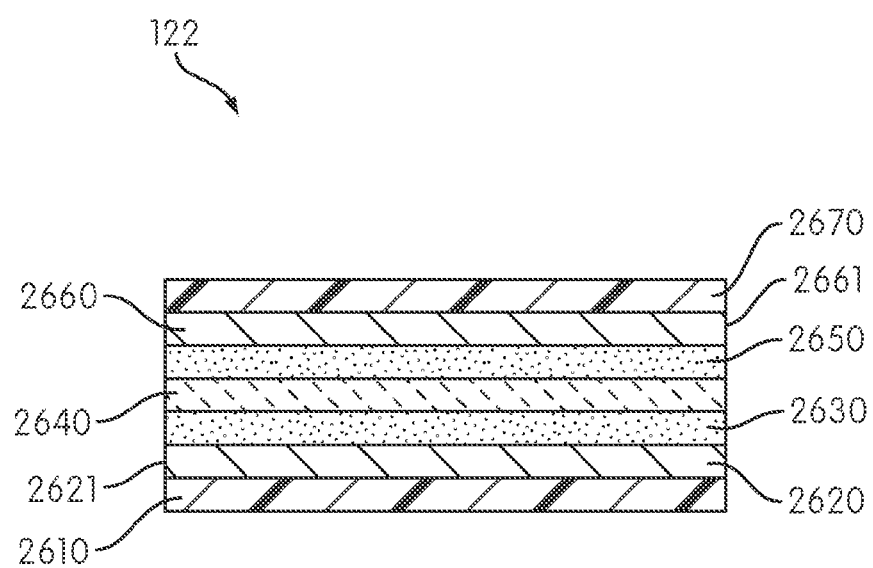
FIG. 26 is a schematic cross-sectional view of an embodiment of a composite material comprising a photonic lattice.

FIG. 26 is a cross-sectional illustration of an embodiment of composite material comprising a photonic lattice in color change portion 122. In the embodiment illustrated in FIG. 26, color change portion 122 comprises photonic lattice layer 2640 with first ("bottom") conductive layer 2630 on one side thereof and second ("top") conductive layer 2650 on the other surface thereof. In some embodiments, first conductive layer 2630, photonic lattice layer 2640, and second conductive layer 2650 may be essentially co-extensive. First conductive layer 2630 and second conductive layer 2650 may be continuous layers. Photonic lattice layer 2640 may be continuous or discontinuous. For example, photonic lattice layer 2640 may be formed in the shape of a design, a pattern, a logo, a number or a letter, or in any other manner in embodiments of the disclosure. The color change portion will be colored only where the photonic lattice is in place.

Typically, in embodiments of the disclosure, the photonic lattice layer is formed on one of the conductive layers, and the other conductive layer then is placed over the photonic lattice in any suitable manner known to the skilled practitioner. For example, a photonic layer can be printed onto one of the conductive layers using a roll-to-roll printing process. With the guidance provided herein, the skilled practitioner will be able to apply a photonic lattice layer to a conductive layer and obtain a desired design, pattern, or the like without undue experimentation.

First ("bottom") terminal 2620 and second ("top") terminal 2660 are electrically connected to the first conductive layer 2630 and second conductive layer 2650, respectively. These terminals are connected by first lead 2621 and second lead 2661, respectively, to provide a path to a source of control and electrical stimulation, such as but not limited to control unit 124 or power source 126 (see AG. 1) to change the dimensions of the photonic lattice and thereby change the color of color change portion 122.

The location of each terminal on each conductive layer is a matter within the skill of the practitioner. Typically, the location is manipulated to accommodate other design preferences, such as but not limited to the location of conductive wires from a remotely-located source of electrical stimulation. In embodiments of the disclosure, a first conductive layer is in electrical contact with a first terminal layer and with a photonic layer, and a second conductive layer is in electrical contact with the photonic layer and a second terminal layer. These and other layers may be bonded or fused together, or may merely be in contact within the color change portion.

Embodiments of the disclosure may have a substrate layer 2610 on the side of terminal layer 2620 opposite the side adjacent conductive layer 2630 carrying photonic lattice layer 2640. Substrate layer 2610 typically is at leant coextensive with first terminal layer 2620 and first conductive layer 2630. Substrate layer 2610 serves to protect first terminal layer 2620 and first conductive layer 2630, and may serve as a connection or attachment surface to the article on which color change portion 122 appears.

Embodiments of the disclosure may have optional protective layer 2670 on the side of second terminal 2660 opposite the side in contact with second conductive layer 2650, as shown in FIG. 26. Protective layer 2670 serves to maintain the physical integrity of and to protect second terminal layer 2660 and second conductive layer 2650 from physical damage caused, for example, by contact with the surface, just as substrate layer 2610 protects first conductive layer 2630 and first terminal layer 2620.

Figure 27:
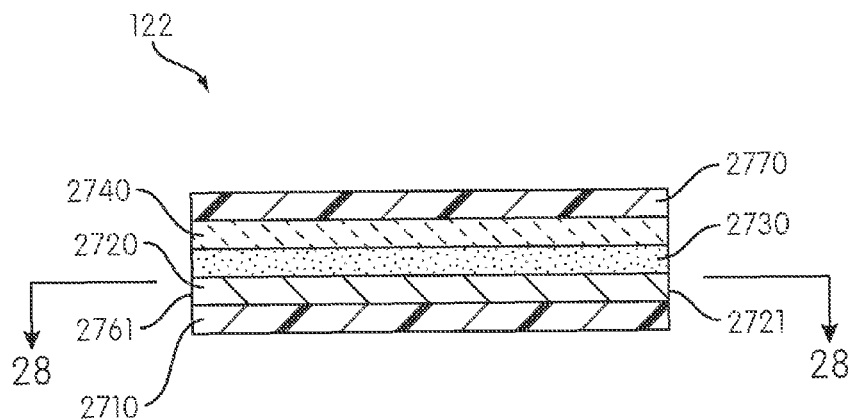
FIG. 27 is a schematic cross-sectional view of an alternate embodiment of a composite material comprising a photonic lattice.
Figure 28:
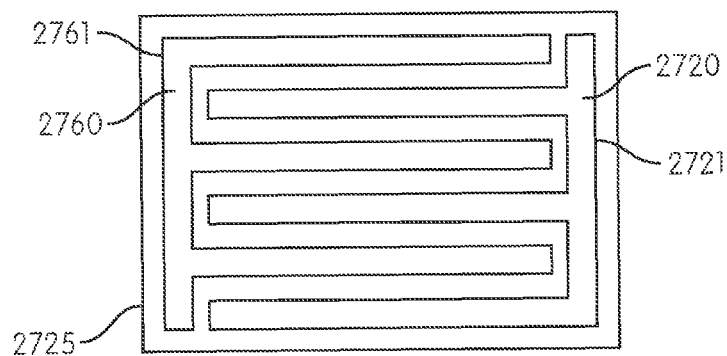
FIG. 28 is a schematic section view of the embodiment of a composite material comprising a photonic lattice depicted in FIG. 27.

FIG. 27 illustrates another embodiment of the disclosure for the structure of color change portion 122. FIG. 27 is a cross-sectional view of an embodiment in which both first terminal 2720 and second terminal 2760 are located in layer 2725 associated with the sole conductive layer 2730. FIG. 28 is the view along section line 28-28 of FIG. 27.

The embodiment of the disclosure illustrated in FIG. 27 has a single conductive layer 2730 on which photonic lattice layer 2740 is formed in any suitable manner. Optional protective layer 2770 is applied to the side of the photonic lattice layer opposite conductive layer 2730.

First terminal 2720 and second terminal 2760 are located in layer 2725 on the side of conductive layer 2730 opposite photonic lattice layer 2740. First lead 2721 and second lead 2761 carry electrical signals from control unit 124 and power source 126 (see FIG. 1). Substrate layer 2710 is located on one side of terminal layer 2725, i.e., on the side opposite photonic lattice layer 2740.

FIG. 28 illustrates section 28-28 of FIG. 27 and shows that first terminal 2720 and second terminal 2760 in terminal layer 2725 have an interdigitated layout. The terminals do not touch each other. Rather, each terminal comprises extended portions that are spaced apart to accommodate extended portions from the other terminal. The extended portions are connected at one end and then to first lead 2721 (first terminal 2720) or second lead 2761 (second terminal 2760). Electrical stimulation flows from one terminal through the conductive layer 2730 and photonic lattice layer 2740 to the other terminal to cause a change in the color of color change portion 122.

In embodiments of the disclosure, the terminal layer may be a layer that is substantially coextensive with the conductive layer with which it is associated. In other embodiments of the disclosure, terminals are interdigitated on and together are substantially coextensive with the single conductive layer. Typically, such arrangements may produce an even color change over the entirety of the color change portion. However, a single terminal may be attached to a conductive layer at a point or small terminal area that is not coextensive with the conductive layer. In such embodiments of the disclosure, the terminals are spaced apart from each other to encourage flow of electrical stimulation throughout the photonic lattice layer. Such an arrangement may produce a 'bloom' of color in the photonic lattice layer, rather than an even color change. However, such terminals may be located anywhere relative to each other.

Color change portion 122 may be constructed from any suitable materials. Thus, materials are selected to provide pre-selected properties and characteristics to color change portion 122. For example, embodiments of the color change portion to be put on the upper of footwear or on clothing may be made of flexible materials. However, if flexibility is not required for the intended use, such as, for example, use on a relatively rigid surface, such as the heel portion of the upper, or the side of a sole of an article of footwear or on sports equipment or accessories, less flexible materials of construction may suitably be used. With the guidance provided herein, the skilled practitioner can select suitable materials of construction without undue experimentation.

In embodiments of the disclosure, the color change portion comprises composite material comprising a photonic lattice. Color changes may be made by electrical stimulation, which may be removed after the target color has been reached, because the photonic lattice is stable at both conditions. The composite material typically comprises a substrate layer, at least one terminal layer, at least one conductive layer, and a photonic lattice layer. The composite material also may include a protective layer.

The substrate layer may be formed from any material that will provide the properties and characteristics selected for the use or application. For example, if the color change portion can be rigid, a rigid substrate, such as but not limited to glass or a rigid plastic such as but not limited to polycarbonate (Plexiglas®, for example) may form a suitable substrate. Typically, the substrate layer is an electrical insulator. If the substrate is electrically conductive, an electrically insulating layer may be interposed between the substrate and the terminal layer. Suitable flexible substrates include flexible plastics, such as but not limited to polypropylene, polyimide, polyethylene terephthalate, or Teflon®.

In some embodiments of the disclosure, the substrate and layers that are behind or beneath the photonic lattice layer may not be in the line of sight of the viewer and therefore may be clear or may have a color, provided that the color does not interfere with the display of color from the color change portion. Because the photonic lattice typically is not translucent but rather will reflect the ambient light, the layers beneath the photonic lattice layer may not be visible. However, the skilled practitioner recognizes that, if the layers behind the photonic lattice layer will be visible, an appropriate color should be selected.

Remaining layers of the composite material comprising a photonic lattice may meet stiffness criteria similar to the requirements of the substrate layer. Thus, if the color change portion need not be flexible, the remaining layers need not be flexible. However, if the color change portion is flexible, the remaining layers also typically will be flexible. Although the substrate and the adjacent (or "bottom" terminal layer) typically may be clear or any color not inconsistent with the display of color from the color change portion, the "top" terminal layer, conductive layer, and protective layer, if present, typically will be selected to be clear or essentially transparent so that the color reflected by the photonic lattice is visible. However, a layer between the photonic lattice layer and the viewer may be non-transparent, if desired. For example, this layer may be translucent or frosted rather than transparent, or may include tinting to produce a color different from that yielded by the photonic lattice layer, or may include a design. Such a design, including but not limited to letters, numbers, shapes, and logotypes, may be displayed in the color change portion by virtue of having been for example, printed onto or etched into the surface of such a layer. With the guidance provided herein, the skilled practitioner will be able to select appropriate materials without undue experimentation.

In embodiments of the disclosure, the 'top' terminal layer typically may comprise clear materials. Fine wires that present an essentially transparent appearance also may be present. Thus, the terminal layers may comprise very thin wires or nanowires that provide an overall impression of transparency. Such wires typically would be very flexible. Conductive polymer fibers also may be suitable. With the guidance provided herein, the skilled practitioner will be able to select suitable materials of construction for these layers without undue experimentation.

The conductive layer may be a conductive plastic, such as but not limited to plastic with a conductive layer thereon, such as but not limited to polyethylene terephthalate with ITO (indium tin oxide) deposited on the surface. Such material typically is essentially transparent. Other suitable plastic include admixtures of conductive solid fillers, such as but not limited to metal particles, carbon black, graphite, or carbon nanotubes, with polymers. Suitable polymers include polyaniline, polypyrrole, and polyethylene terephthalate. Any essentially transparent or translucent conductive material may be suitable for the "top" conductive layer. The "bottom" layers also may be transparent or translucent, With the guidance provided herein, the skilled practitioner will be able to identify and select suitable materials for these layers.

The composition of the photonic lattice layer depends upon the colors to be displayed, as set forth above and in the materials related thereto and incorporated by reference. The protective layer may be any suitable transparent material that provides the desired degree of protection against damage. As with other layers, the protective layer may be flexible, such as but not limited to a flexible layer of polyethylene, polypropylene, or polyethylene terephthalate, or may be rigid, such as but not limited to glass or polycarbonate. The skilled practitioner will be able to select a composition for an optional protective layer, if present, with the guidance provided herein.

In some embodiments of the disclosure, a control feature in the form of a touch screen may be incorporated into the composite material as part of the protective layer. The skilled practitioner recognizes that both capacitive and resistive touchscreens are commercially available from many sources. Either type of touchscreen may be incorporated into the protective layer in embodiments of the disclosure herein.

A touchscreen control feature may control any electronic feature of the color change portion, typically through a controller. For example, the touchscreen may be used to activate or deactivate (turn on or off) the color change portion of a composite material. In particular, the touchscreen may be used to change the color of the color change portion. On either type of touchscreen, the color may change continuously while the screen is touched. On a capacitive screen, a motion of one or more fingers may be used to change the color, for example. With the guidance provided herein, the skilled practitioner will be able to incorporate a touchscreen control feature into the protective layers of embodiments of the disclosure.

In embodiments of the disclosure, the composite material comprising a photonic lattice may be coated in a layer of silicone or a similar typically flexible, tough, elastic, essentially transparent or translucent material resistant to folding and creasing. This type of coating, which is both tough and resistant to sharp bending (folding and creasing), may protect the composite material comprising a photonic lattice from both physical damage from impacts, for example, and mechanical damage, such as but not limited to damage from folding or creasing. Such mechanical damage may occur if the composite material comprising a photonic lattice is sufficiently flexible that it can be folded or bent and creased. Folding or creasing the photonic lattice layer may cause 'dead zones' in the layer, i.e., zones that are not responsive to electrical stimulus and thus are permanently colored with the color present before the mechanical damage occurred. A coating of silicone or similar material that typically is flexible yet resistant to folding or creasing may ameliorate damage of this type.

The skilled practitioner recognizes that incorporating a coating of silicone or other material on a color change portion may preclude operation of a capacitive touchscreen. Such a layer may prevent registration on the screen of a touch by a user. If such a protective silicone layer is used, a resistive touchscreen may be a better choice for a control feature incorporated with a protective layer.

In embodiments of the disclosure, a control feature in the form of a touchscreen also may be placed remotely from the color change portion, rather than on the color change portion itself. Such a remote location may make it easier to operate the color change portion or serve another purpose. In embodiments of the disclosure, a touchscreen may be placed elsewhere on an article of footwear, and may be connected to both the color change portion and to the power source or controller associated with the color change system. In some embodiments of the disclosure, a touchscreen may be placed on a part of a shoe, for example, at the heel, on another decorative feature, such as on a manufacturer's logotype, on decorative trim, on a medial portion (or lateral portion) of the midfoot upper, or elsewhere. Location of such a touchscreen in embodiments of the disclosure is, with the guidance provided herein, within the skill of the practitioner.

Embodiments of composite materials comprising a photonic lattice may be constructed in any suitable manner. As noted above, the photonic lattice is applied to a conductive layer by, for example, screen printing, in a desired pattern to obtain a design, including designs having multiple controllers for individual control of the color in different areas of the design, may be applied to the entirety of a conductive layer, or different photonic lattices may be applied to separate areas of the conductive layer to provide different colors. Other methods of applying photonic lattice material to selected areas of a conductive surface, such as by jet printing, also may be used.

The composite material comprising a photonic lattice may be assembled by stacking layers in order. In some embodiments of the disclosure, the layers may be fused with adhesive by application of heat at a temperature, for a time, and at a pressure sufficient to fuse the layers and form a composite material comprising a photonic lattice. The layers may be fused on the periphery or across the entirety of the area.

In embodiments of the disclosure, suitable adhesives include heat-lettable adhesives having a melting point below the melting point of other components of the color change portion. In some embodiments of the disclosure, the adhesive is selected to yield a bond that is sufficiently flexible so as not to interfere with the flexibility of the color change portion. In some embodiments of the disclosure, hot melt adhesive may be suitable as an adhesive. Hot melt adhesives may be applied hot or may be set in place as a solid. In the solid technique, the adhesive is placed between layers to be bonded and heated to melt the adhesive between the layers and form a bond between the layers. For example, Bemis 3218, available from Bemis Associates Inc., Shirley, Mass., USA, may be suitable for embodiments of the disclosure.

Bemis 3218 comprises polyurethane, is flexible over a wide range of temperature, and has a softening point of about 200° F. (about 94° C.). Typically, the adhesive is heated to a temperature of at least about 250° F. (122° C.) for convenient processing. For example, this adhesive may be put in place as a solid sheet of suitable thickness, then heated and pressed together with other layers of the color change portion. The molten adhesive thus flows sufficiently to fuse the layers when heated and pressed. In embodiments of the disclosure, Bemis 3218 is heated to a temperature of between about 250° F. and about 325° F. (about 122° C. to about 163° C.) and pressed with other layers for between about 10 seconds and about 50 seconds to form the composite material of the disclosure. Other adhesive will require different combinations of temperature and time to form a suitable bond. However, with the guidance provided herein, the skilled practitioner will be able to select a suitable adhesive and to identify suitable binding conditions.

In embodiments of the disclosure, the color change portion also may be used to reflect infrared radiation or ultraviolet radiation. Thus, when oriented to reflect radiation from the surroundings, the color change portion can be used to shield the user from heat introduced by infrared radiation or damage from ultraviolet radiation. Similarly, the color change portion may be oriented to reflect infrared radiation toward a user. Thus oriented on the inside of a shirt, for example, the color change portion may be used to reflect infrared radiation toward a person. Such an embodiment is illustrated in FIG. 29 and FIG. 30.

Figure 29:
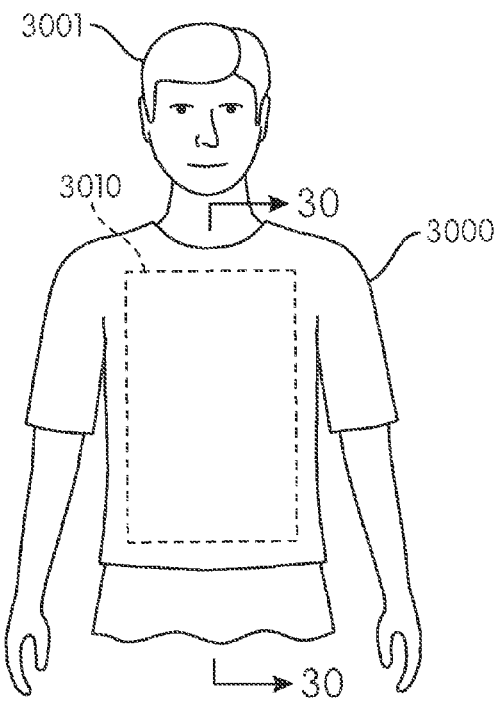
FIG. 29 is a schematic view of an article of clothing with a color change portion associated with an interior surface of the clothing.
Figure 30:
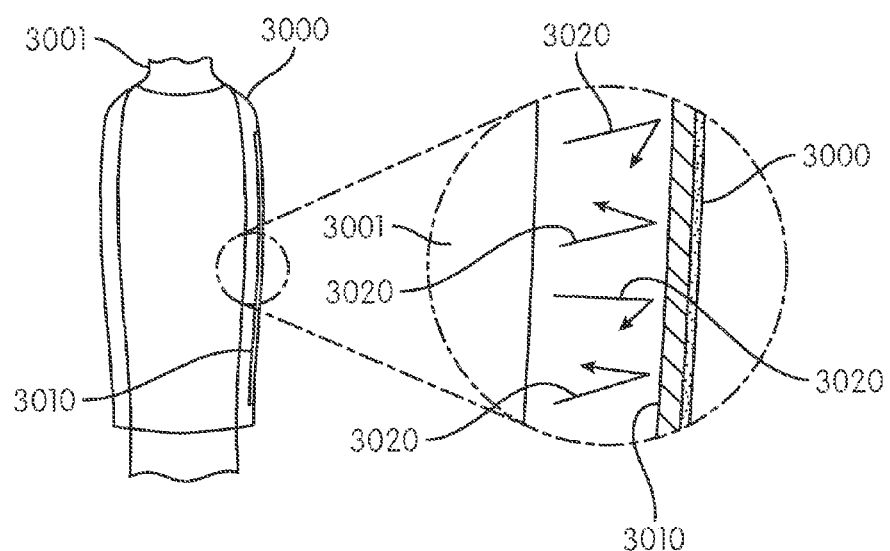
FIG. 30 is a sectional view of the embodiment of FIG. 29.

FIG. 29 illustrates a front view of a color change portion 3010 oriented on the inside of shirt 3000 to reflect infrared radiation from user 3001. Section 30-30, illustrated in FIG. 30, is a cross-sectional view of the embodiment illustrated in FIG. 29. Color change portion comprising composite material comprising a photonic lattice 3010 is attached in any suitable manner to the interior of shirt 3000 so as to reflect infrared radiation to user 3001. Arrows 3020 illustrate a path of infrared radiation from the body of user 3001 to color change portion comprising composite material comprising a photonic lattice 3020, which reflects the radiation back to wearer 3001.

The physical structure of a color change portion comprising composite material comprising a photonic lattice is illustrated in FIG. 26-FIG. 28. In embodiments of the disclosure, the composite material comprising a photonic lattice may have essentially any two-dimensional shape, such as but not limited to a circle, an oblong, a cross, a rectangle, or a square. Composite material comprising a photonic lattice also may be formed in the shape of a letter or number, words, logos, and the like. The composite material comprising a photonic lattice may be mounted on or otherwise suitably attached to a surface, such as but not limited to an article of clothing, footwear, or sports and other equipment. In other embodiments of the disclosure, the composite material comprising a photonic lattice may be integrated with the materials forming an outer surface, and the composite material comprising a photonic lattice may be viewed through an aperture in that surface.

Figure 31:
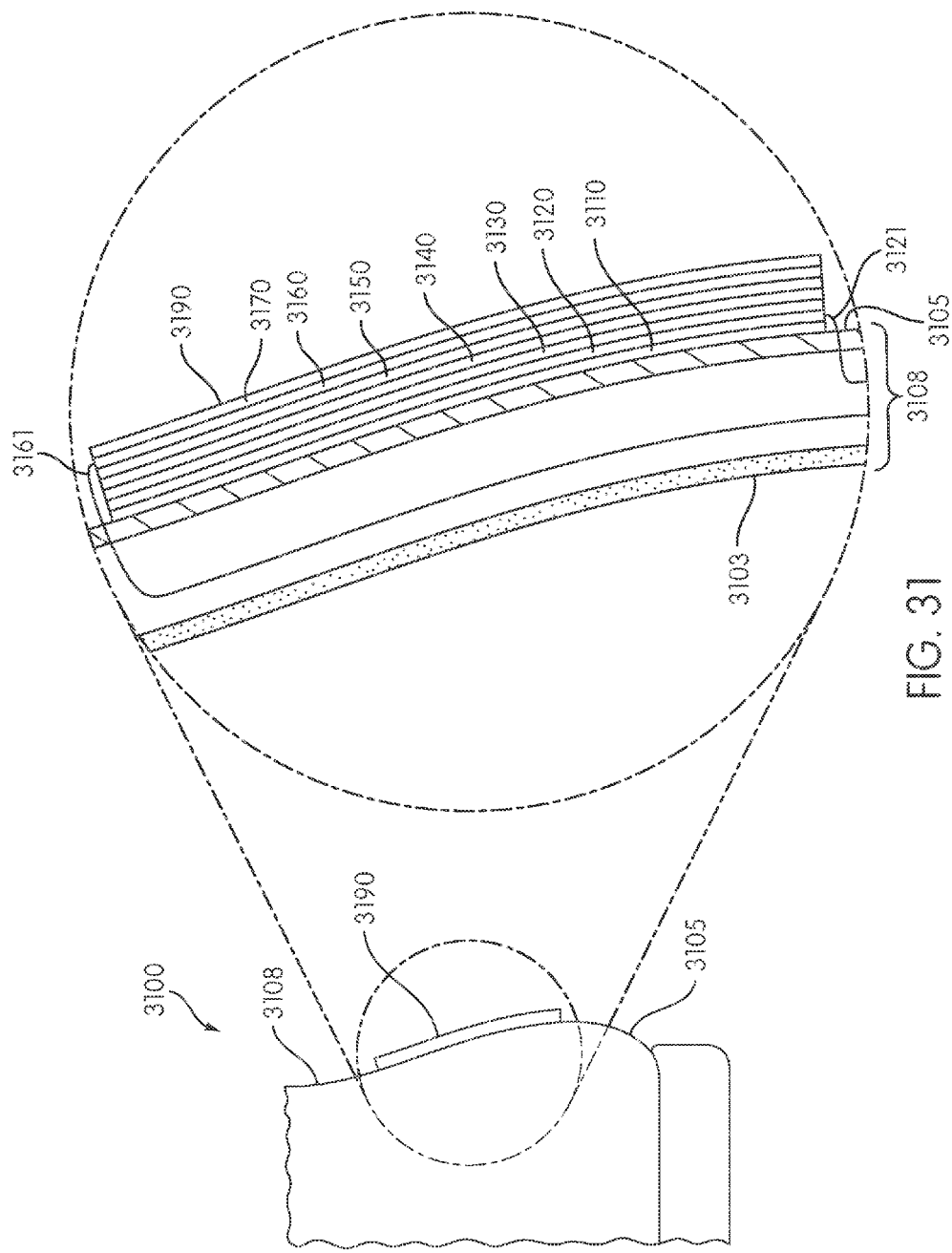
FIG. 31 is a cross-sectional view of an embodiment of a composite material comprising a photonic lattice mounted on an upper of an article of footwear.

FIG. 31 illustrates color change portion 3190 mounted on the outside or exterior 3105 of upper 3108 of shoe 3100. The upper may include optional sock liner 3103 and other layers not shown. Optional sock liner 3103 is inside upper 3108. As can be seen in the detail of FIG. 31, substrate layer 3110 of color change portion 3190 is attached on one side to the outside 3105 of the upper 3108 of shoe 3100. First terminal layer 3120 is adjacent the other side of substrate layer 3110, and first conductive layer 3130 with photonic lattice layer 3140 thereon form the next layers. Photonic lattice layer 3140 is covered with one side of second conductive layer 3150, and second terminal layer 3160 forms the next layer on the other side of second conductive layer 3150. Optional protective cover layer 3170 covers the entirety to protect color change portion 3190 from physical damage. First lead 3121 from first terminal layer 3120 and second lead 3161 from second terminal layer 3160 enable connection to conductors such as conductive wires to carry signals from the controller or power source (not shown). Typically, the electrical conductors or leads may be brought into the footwear through outer layer 3105, but typically are not brought through sock liner 3103, if present. In this way, the leads and conductors may be routed into the article of footwear to control unit 124 and power source 126 (see FIG. 1) safely and securely, i.e., away from contact with the foot, for example.

In such embodiments of the disclosure, color change portion 3190 may be attached to outer surface 3105 of upper 3108 in any suitable manner. For example, color change portion 3190 may be adhered to outer surface 3105 with adhesive, adhesive or other tape, or glue, or may be stitched in place. Color change portion 3190 also may be ultrasonically welded to outer surface 3105 of upper 3108, if appropriate. With the guidance provided herein, the skilled practitioner will be able to attach a color change portion to a garment of article of footwear.

The skilled practitioner recognizes that a color change portion may have both terminals interdigitated and connected to the same side of a single conductive layer. Color change portions having such construction also are suitably used in any embodiments of the disclosure.

Figure 32:
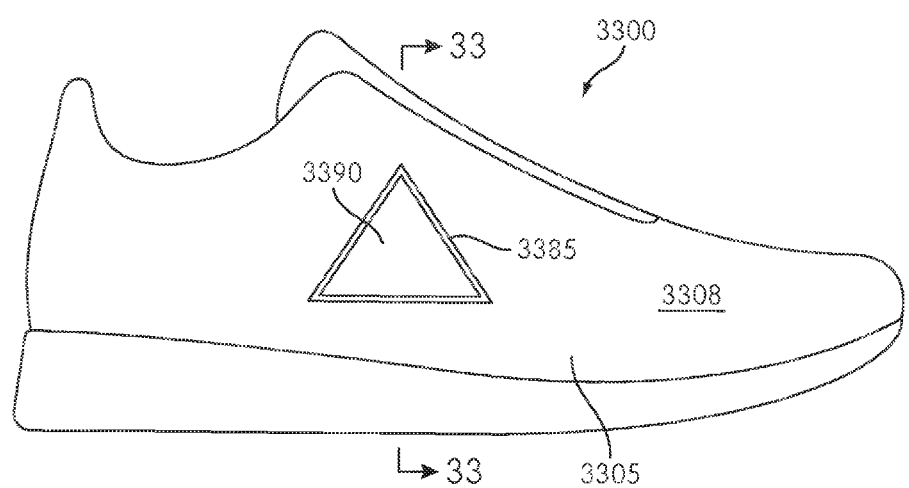
FIG. 32 is a schematic view of an embodiment of a composite material comprising a photonic lattice mounted in an aperture in the upper of an article of footwear.
Figure 33:
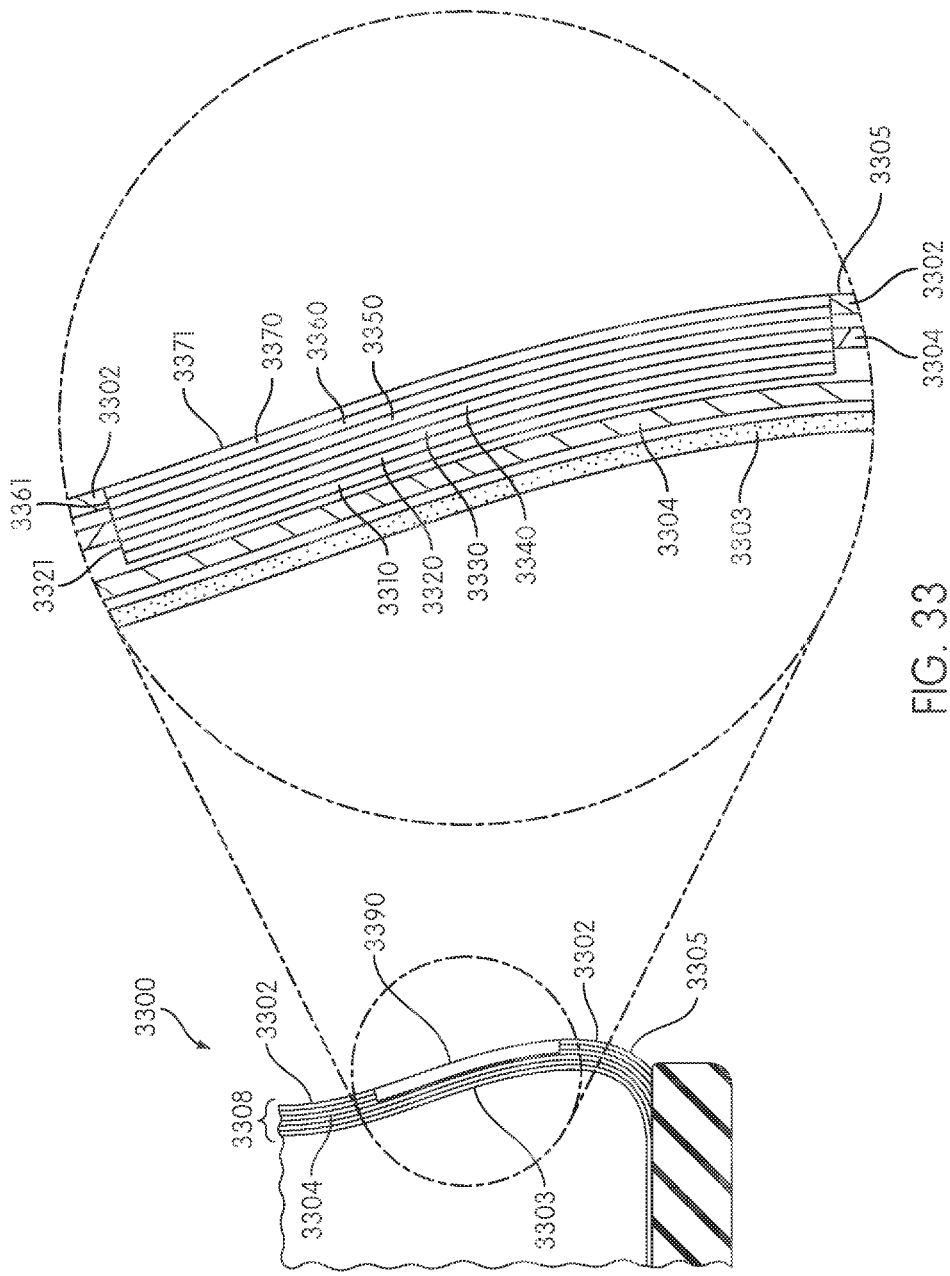
FIG. 33 is a cross-sectional view of the embodiment of FIG. 33.

In other embodiments of the disclosure, the color change portion is mounted within apertures of multiple layers of a shoe upper, for example. FIG. 32 and FIG. 33 illustrate such construction. Outer surface 3371 of optional protective layer 3370, or the top of second terminal layer 3360, of color change portion 3390 may be essentially flush with outer surface 3305 of outer layer 3302 of shoe 3300, to which the color change portion 3390 is attached. In other embodiments of the disclosure, surface 3371 may be behind outer surface 3305, or may protrude beyond outer surface 3305. FIG. 32 and FIG. 33 illustrate the essentially flush embodiments of the disclosure as they relate to shoe 3300.

Upper 3308 includes at least outer layer 3302 having outer surface 3305 and one or more intermediate layers 3304 (three are illustrated in FIG. 33) associated with outer layer 3302. These intermediate layers 3304 may be bonded or otherwise attached to or associated with outer layer 3302 and optional sock liner 3303. In the embodiment of FIG. 32 and FIG. 33, the area of color change portion 3390 is essentially equal to and coextensive with the area and shape of aperture 3385 in outer layer 3302 through which color change portion 3390 is visible. As the skilled practitioner recognizes, any related apertures in intermediate layers 3304 through which color change portion 3390 is visible from the outside of the article of footwear, will tend to reduce the incursion of color change portion 3390 into the footspace in the article of footwear. This reduces the likelihood of irritation of the wearer's foot resulting from contact, such as but not limited to rubbing and chafing, with color change portion 3390. However, layers 3304 may not have apertures, but rather form a continuous additional layer of the upper 3308 of shoe 3300 between the substrate layer 3310 and the interior of the article of footwear (and the wearer's foot). Thus, outer layer 3302 has an aperture essentially coextensive with the shape and size of color change portion 3390. One or more layers 3304 also may have apertures. In FIG. 33, two layers 3304 are illustrated having apertures, and the innermost layer 3304 does not have an aperture.

The arrangement of layers of color change portion 3390 is the same as for color change portion 3190, i.e., in order, substrate layer 3310, first terminal layer 3320, first conductive layer 3330, onto which photonic lattice layer 3340 has been printed or otherwise formed, second conductive layer 3350 with the second terminal layer 3360 and optional protective layer 3370 thereon. First lead 3321 from first terminal layer 3320 and second lead 3361 from second terminal layer 3360 connect to conductors, for example, wires, that carry signals from power source 126 and control unit 124 (see FIG. 1). The leads and conductors may be located between any of intermediate layers 3304, sock liner 3303, and outer layer 3302.

In such embodiments, the uppermost layer of color change portion 3390 typically may be essentially in the same plane as outer surface 3305 of upper layer 3308. Thus, if optional protective layer 3370 is present, surface 3371 may be essentially co-planar with outer surface 3305. If there is no protective layer, the top surface of terminal layer 3360, or of the layer that is the top-most, is essentially co-planar with surface 3305. In such embodiments, the color change portion is secured to upper 3308 by any appropriate means known to the skilled practitioner, such as but not limited to adhesive, adhesive tape, ultrasonic welding if appropriate, or stitching. Alternatively, substrate 3310 may be secured to any of intermediate layers 3304 or to sock liner 3303 to be held in place in aperture 3385 of upper 3308. With the guidance provided herein, the skilled practitioner will be able to identify and utilize suitable technology for securing the color change portion in position in the aperture in the article.

In some embodiments of the disclosure, it may be preferred to shape the aperture in the shoe or article for the color change portion differently from the shape of the color change portion, or in a size, typically smaller, different from the color change portion. An example of such an embodiment is illustrated in FIG. 34 and FIG. 35.

Figure 34:
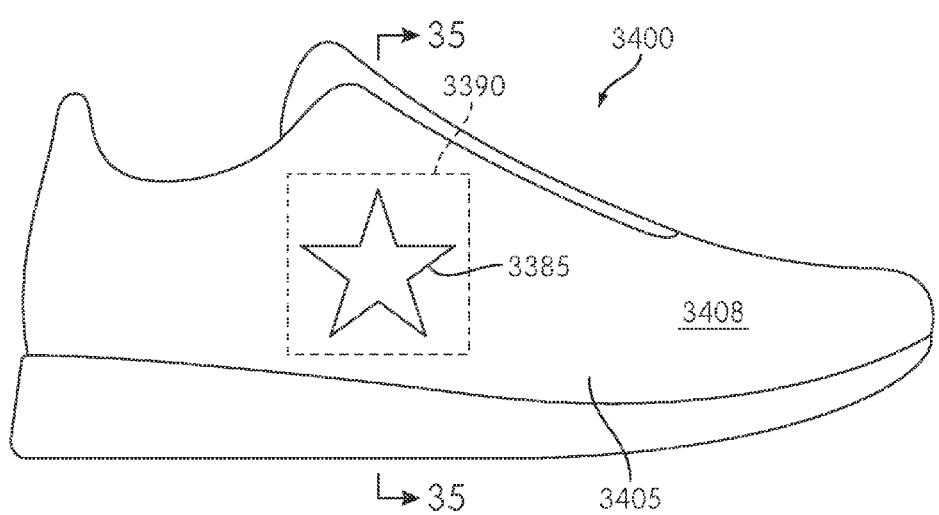
FIG. 34 is a schematic view of an embodiment of a composite material comprising a photonic lattice mounted behind an aperture in the upper of an article of footwear, the aperture being smaller in at least one dimension than the composite material comprising a photonic lattice.

FIG. 34 illustrates star-shaped aperture 3485 in outer surface 3405 of upper layer 3408 of shoe 3400. The aperture is in at least outer layer 3402 of shoe upper layer 3408. In such an embodiment, the shape of aperture 3485 may be any two-dimensional shape. Typically, aperture 3485 has a shape or size different from, and typically smaller than, the shape or size of color change portion 3490.

FIG. 35 is a cross-sectional view of section 35-35 of FIG. 34. FIG. 35 illustrates color change portion 3490 behind aperture 3485 with the top surface of color change portion 3490 essentially co-planar with outer surface 3405 of upper layer 3408. However, because the aperture 3845 typically is smaller than color change portion 3490, layer 3402 extends or overlaps to an extent onto top surface 3471 of color change portion 3490. Typically, outer layer 3402 is thin, and may be sufficiently flexible to allow the surface 3471 of color change portion 3490 to be substantially co-planar with surface 3405. Typically, any apertures in layers 3404 or sock liner 3403 will be essentially coextensive with the size and shape of color change portion 3490. In FIG. 35, two intermediate layers 3404 have apertures essentially coextensive with the size and shape of color change portion 3490, and one intermediate layer 3404 has no aperture.

The arrangement of layers in color change portion 3490 remains the same, i.e., in order, substrate layer 3410, first terminal layer 3420, first conductive layer 3430, photonic lattice layer 3440, second conductive layer 3450, second terminal layer 3460, and optional protective layer 3470 having surface 3471. Surface 3471 is directly adjacent to the outer layer of shoe 3400. First lead 3421 and second lead 3461 connect first terminal 3420 and second terminal 3460, respectively, to conductors that carry a signal between color change portion 3490 and control unit 124 and power source 126 (see FIG. 1). Outer surface 3402 may be adhered or otherwise secured to protective layer surface 3471 or to the top layer of color change portion 3490 if no protective layer is present.

EXAMPLE 1

A composite material comprising a photonic lattice was constructed using the materials identified in the following table:

| Component | Material |
| --- | --- |
| Substrate | Flexible plastic |
| Terminal layers | Polyethylene terephthalate |
| Conductive layers | ITO on polyethylene terephthalate |
| Photonic lattice | Reversibly changeable by electrical stimulation |

The photonic lattice was applied to essentially the entirety of a conductive layer by screen printing. The composite material comprising a photonic lattice was manufactured by assembling the layers in order (substrate, terminal with lead, first conductive layer, photonic lattice layer, and second conductive layer, second terminal with second lead, and protective layer) and fusing them at the edges with Bemis 3218 adhesive at a temperature of 300° F. (149° C.) for 25 seconds to form the composite material comprising a photonic lattice.

The composite material comprising a photonic lattice thus formed a color change portion that was shaped roughly like the intended display. The color change portion was secured to the inside of the upper of an athletic shoe upper through which an aperture having the intended shape of the display had been made with adhesive tape. The aperture was smaller than the color change portion. The leads of the color change portion then were connected to a power source through conductors and electrical stimulation was used to change the color of the color change portion, at which time the power source was disconnected. The color change portion maintained the color to which it had been changed until a power source was again connected and the color change portion was returned to the original color.

While various embodiments of the invention have been described, the description is intended to be exemplary, rather than limiting and it will be apparent to those of ordinary skill in the art that many more embodiments and implementations are possible that are within the scope of the invention. For example, the color change portion may be manufactured to have the desired image shape and size, the color range may be different, the color change portion may be mounted on the outside surface of an athletic shoe, the color change portion may be mounted on a different article of footwear or an article of clothing, or the composite material comprising a photonic lattice may have a different construction or method of manufacture. Accordingly, the invention is not to be restricted except in light of the attached claims and their equivalents. Also, various modifications and changes may be made within the scope of the attached claims.

What is claimed is:

1. An article of footwear comprising:
a color change portion operable to display a first color in a first mode of operation and operable to display a second color different than the first color in a second mode of operation, the color change portion including an electrochromographic material comprising a photonic lattice and operable in the first mode of operation when a performance parameter of the article of footwear is in a first range of values and operable in the second mode of operation when the performance parameter of the article of footwear is in a second range of values different than the first range of values.

2. The article of footwear of claim 1, wherein the electrochromographic material comprises a composite material comprising the photonic lattice.

3. The article of footwear of claim 2, wherein the photonic lattice includes a cross-linked polymeric network having an electronic configuration.

4. The article of footwear of claim 3, further comprising controlling the electronic configuration of the polymeric network.

5. The article of footwear of claim 1, wherein the color change portion is operable to reflect infrared radiation or ultraviolet radiation.

6. The article of footwear of claim 1, wherein the performance parameter is at least one of a number of heel strikes of the article of footwear, the number of steps taken, the number of jumps performed, the temperature of a region of the article of footwear, and the moisture of a region of the article of footwear.

7. An article of footwear comprising:
a color change portion operable to display a first color in a first mode of operation and operable to display a second color different than the first color in a second mode of operation, the color change portion including an electrochromographic material comprising a photonic lattice and operable in the first mode of operation or the second mode of operation based on an electrical signal applied to the electrochromographic material.

8. The article of footwear of claim 7, wherein the electrochromographic material comprises a composite material comprising the photonic lattice.

9. The article of footwear of claim 7, wherein the photonic lattice includes a cross-linked polymeric network having an electronic configuration.

10. The article of footwear of claim 9, further comprising controlling the electronic configuration of the polymeric network.

11. The article of footwear of claim 7, wherein the color change portion is operable to reflect infrared radiation or ultraviolet radiation.

12. The article of footwear according to claim 7, wherein the electrochromographic material comprises two or more independently electrically addressable composite materials comprising the photonic lattice.

13. The article of footwear according to claim 7, wherein the electrochromographic material displays a multi-colored visual image upon application of the electrical signal.

14. The article of footwear according to claim 13, wherein the multi-colored visual image is a still image or an animated image.

15. The article of footwear according to claim 14, wherein the electrochromographic material comprises two or more composite materials comprising the photonic lattice that are not independently electrically addressable.

16. The article of footwear according to claim 7, wherein the electrochromographic material is shaped into a three-dimensional conformation.

17. The article of footwear according to claim 7, wherein the color change portion comprises an entire upper of the article of footwear.

18. An article of footwear comprising:
a color change portion including an electrochromographic material comprising a photonic lattice, the electrochromographic material operable to receive an electrical signal to change a color of the color change portion based on a color of an object associated with a user of the article of footwear.

19. The article of footwear of claim 18, wherein the electrochromographic material comprises a composite material comprising the photonic lattice.

20. The article of footwear of claim 19, wherein the photonic lattice includes a cross-linked polymeric network having an electronic configuration.

* * * * *